(12) United States Patent
Wedding et al.

(10) Patent No.: US 7,791,037 B1
(45) Date of Patent: Sep. 7, 2010

(54) PLASMA-TUBE RADIATION DETECTOR

(75) Inventors: Carol Ann Wedding, Toledo, OH (US); Thomas J. Pavliscak, Palos Verdes Estates, CA (US)

(73) Assignee: Imaging Systems Technology, Toledo, OH (US)

( * ) Notice: Subject to any disclaimer, the term of this patent is extended or adjusted under 35 U.S.C. 154(b) by 83 days.

(21) Appl. No.: 11/684,143

(22) Filed: Mar. 9, 2007

Related U.S. Application Data

(60) Provisional application No. 60/782,522, filed on Mar. 16, 2006.

(51) Int. Cl.
*G01J 1/58* (2006.01)
*G01T 1/18* (2006.01)

(52) U.S. Cl. .............. 250/374; 250/486.1; 250/370.09; 250/483.1; 250/385.1; 315/111.21; 315/344

(58) Field of Classification Search .............. 250/336.1, 250/340, 483.1, 486.1, 349, 357.1, 370.1, 250/374, 385.1; 315/111.21, 344
See application file for complete search history.

(56) References Cited

U.S. PATENT DOCUMENTS

| | | | |
|---|---|---|---|
| 2,187,432 A | 1/1940 | Powers | |
| 2,644,113 A | 6/1953 | Etzkorn | |
| 3,050,654 A | 8/1962 | Toulon | |
| 3,110,835 A | 11/1963 | Richer et al. | |
| 3,264,073 A | 9/1966 | Schmitt et al. | |
| 3,365,315 A | 1/1968 | Beck et al. | |
| 3,602,754 A | 8/1971 | Pfaender et al. | |
| 3,646,384 A | 2/1972 | Lay | |
| 3,652,891 A | 3/1972 | Janning | |
| 3,654,680 A | 4/1972 | Bode et al. | |
| 3,666,950 A | 5/1972 | Ferber et al. | |
| 3,666,981 A | 5/1972 | Lay | |
| 3,674,461 A | 7/1972 | Farnand et al. | |
| 3,699,050 A | 10/1972 | Henderson | |
| 3,793,041 A | 2/1974 | Sowman | |
| 3,811,061 A | 5/1974 | Nakayama et al. | |

(Continued)

FOREIGN PATENT DOCUMENTS

WO    WO 98/28635    7/1998

(Continued)

*Primary Examiner*—David P Porta
*Assistant Examiner*—Yara B Green
(74) *Attorney, Agent, or Firm*—Donald K. Wedding

(57) ABSTRACT

A radiation detection device comprising a plasma display panel (PDP) with a multiplicity of radiation detection pixels, each radiation detection pixel being defined by a hollow elongated Plasma-tube filled with an ionizable gas. Arrays of Plasma-tubes are positioned on a suitable base such as a substrate and used to inspect and detect radiation from a selected object. Each Plasma-tube may be of any suitable geometric configuration and may be used alone or in any combination with one or more Plasma-shells, such as a Plasma-disc, Plasma-dome, and/or Plasma-sphere. Luminescent material may be positioned near or on each Plasma-tube or Plasma-shell to provide or enhance light output. A flexible base substrate may be used to wrap a layer or blanket of radiation detection Plasma-tubes about the selected object. The substrate base may comprise an elongated rod that is used as a probe to detect radiation from an object. An object may be passed through a ring or a cylinder of Plasma-tubes.

21 Claims, 12 Drawing Sheets

U.S. PATENT DOCUMENTS

| | | |
|---|---|---|
| 3,838,998 A | 10/1974 | Matthews et al. |
| 3,848,248 A | 11/1974 | MacIntyre |
| 3,860,846 A | 1/1975 | Mayer |
| 3,885,195 A | 5/1975 | Amano |
| 3,916,584 A | 11/1975 | Howard et al. |
| 3,927,342 A | 12/1975 | Bode et al. |
| 3,935,494 A | 1/1976 | Dick et al. |
| 3,964,050 A | 6/1976 | Mayer |
| 3,969,718 A | 7/1976 | Strom |
| 3,975,194 A | 8/1976 | Farnand et al. |
| 3,990,068 A | 11/1976 | Mayer et al. |
| 3,998,618 A | 12/1976 | Kreik et al. |
| 4,027,188 A | 5/1977 | Bergman |
| 4,035,690 A | 7/1977 | Roeber |
| 4,038,577 A | 7/1977 | Bode et al. |
| 4,075,025 A | 2/1978 | Rostoker |
| 4,106,009 A | 8/1978 | Dick |
| 3,607,169 A | 9/1978 | Coxe |
| 4,119,422 A | 10/1978 | Rostoker |
| 4,126,807 A | 11/1978 | Wedding et al. |
| 4,126,809 A | 11/1978 | Wedding et al. |
| 4,133,854 A | 1/1979 | Hendricks |
| 4,163,637 A | 8/1979 | Hendricks |
| 4,164,678 A | 8/1979 | Biazzo et al. |
| 4,166,147 A | 8/1979 | Lange et al. |
| 4,201,692 A | 5/1980 | Christophorou et al. |
| 4,257,798 A | 3/1981 | Hendricks et al. |
| 4,279,632 A | 7/1981 | Frosch et al. |
| 4,290,847 A | 9/1981 | Johnson et al. |
| 4,303,061 A | 12/1981 | Torobin |
| 4,303,431 A | 12/1981 | Torobin |
| 4,303,432 A | 12/1981 | Torobin |
| 4,303,433 A | 12/1981 | Torobin |
| 4,303,603 A | 12/1981 | Torobin |
| 4,303,729 A | 12/1981 | Torobin |
| 4,303,730 A | 12/1981 | Torobin |
| 4,303,731 A | 12/1981 | Torobin |
| 4,303,732 A | 12/1981 | Torobin |
| 4,303,736 A | 12/1981 | Torobin |
| 4,307,051 A | 12/1981 | Sargeant et al. |
| 4,309,307 A | 1/1982 | Christophorou et al. |
| 4,314,827 A | 2/1982 | Leitheiser et al. |
| 4,322,378 A | 3/1982 | Hendricks |
| 4,344,787 A | 8/1982 | Beggs et al. |
| 4,349,456 A | 9/1982 | Sowman |
| 4,363,646 A | 12/1982 | Torobin |
| 4,391,646 A | 7/1983 | Howell |
| 4,392,988 A | 7/1983 | Dobson et al. |
| 4,415,512 A | 11/1983 | Torobin |
| 4,459,145 A | 7/1984 | Elsholz |
| 4,494,038 A | 1/1985 | Wedding et al. |
| 4,525,314 A | 6/1985 | Torobin |
| 4,542,066 A | 9/1985 | Delzant |
| 4,547,233 A | 10/1985 | Delzant |
| 4,548,196 A | 10/1985 | Torobin |
| 4,548,767 A | 10/1985 | Hendricks |
| 4,553,062 A | 11/1985 | Ballon et al. |
| 4,568,389 A | 2/1986 | Torobin |
| 4,582,534 A | 4/1986 | Torobin |
| 4,596,681 A | 6/1986 | Grossman et al. |
| 4,605,859 A | 8/1986 | DiIanni et al. |
| 4,618,525 A | 10/1986 | Chamberlain et al. |
| 4,631,411 A | 12/1986 | Noback |
| 4,637,990 A | 1/1987 | Torobin |
| 4,638,218 A | 1/1987 | Shinoda et al. |
| 4,671,909 A | 6/1987 | Torobin |
| 4,713,300 A | 12/1987 | Sowman et al. |
| 4,737,687 A | 4/1988 | Shinoda et al. |
| 4,743,511 A | 5/1988 | Sowman et al. |
| 4,743,545 A | 5/1988 | Torobin |
| 4,757,036 A | 7/1988 | Kaar et al. |
| 4,777,154 A | 10/1988 | Torobin |
| 4,778,502 A | 10/1988 | Garnier et al. |
| 4,793,980 A | 12/1988 | Torobin |
| 4,797,378 A | 1/1989 | Sowman |
| 4,800,180 A | 1/1989 | McAllister et al. |
| 4,818,884 A | 4/1989 | Saubolle |
| 4,855,889 A | 8/1989 | Blanchot et al. |
| 4,857,739 A | 8/1989 | Phelps |
| 4,865,875 A | 9/1989 | Kellerman |
| 4,879,321 A | 11/1989 | Laroche |
| 4,883,779 A | 11/1989 | McAllister et al. |
| 4,963,792 A | 10/1990 | Parker |
| 5,017,316 A | 5/1991 | Sowman |
| 5,053,436 A | 10/1991 | Delgado |
| 5,069,702 A | 12/1991 | Block et al. |
| 5,077,241 A | 12/1991 | Moh et al. |
| 5,185,299 A | 2/1993 | Wood et al. |
| 5,212,143 A | 5/1993 | Torobin |
| 5,225,123 A | 7/1993 | Torobin |
| 5,326,298 A | 7/1994 | Hotomi |
| 5,793,158 A | 8/1998 | Wedding |
| 5,905,262 A | 5/1999 | Spanswick |
| 5,984,747 A | 11/1999 | Bhagavatula et al. |
| 6,031,890 A | 2/2000 | Bermbach et al. |
| 6,255,777 B1 | 7/2001 | Kim et al. |
| 6,368,708 B1 | 4/2002 | Brown et al. |
| 6,545,422 B1 | 4/2003 | George et al. |
| 6,570,335 B1 | 5/2003 | George et al. |
| 6,612,889 B1 | 9/2003 | Green et al. |
| 6,620,012 B1 | 9/2003 | Johnson et al. |
| 6,633,117 B2 * | 10/2003 | Shinoda et al. ............. 313/484 |
| 6,646,388 B2 | 11/2003 | George et al. |
| 6,650,055 B2 * | 11/2003 | Ishimoto et al. ............. 313/623 |
| 6,677,704 B2 | 1/2004 | Ishimoto et al. |
| 6,708,140 B2 | 3/2004 | Zerwekh et al. |
| 6,727,506 B2 | 4/2004 | Mallette |
| 6,762,566 B1 | 7/2004 | George et al. |
| 6,764,367 B2 | 7/2004 | Green et al. |
| 6,791,264 B2 | 9/2004 | Green et al. |
| 6,794,812 B2 | 9/2004 | Yamada et al. |
| 6,796,867 B2 | 9/2004 | George et al. |
| 6,801,001 B2 * | 10/2004 | Drobot et al. ............. 315/169.3 |
| 6,822,626 B2 | 11/2004 | George et al. |
| 6,836,063 B2 | 12/2004 | Ishimoto et al. |
| 6,836,064 B2 | 12/2004 | Yamada et al. |
| 6,841,929 B2 | 1/2005 | Ishimoto et al. |
| 6,857,923 B2 | 2/2005 | Yamada et al. |
| 6,864,631 B1 | 3/2005 | Wedding |
| 6,893,677 B2 | 5/2005 | Yamada et al. |
| 6,902,456 B2 | 6/2005 | George et al. |
| 6,914,382 B2 | 7/2005 | Ishimoto et al. |
| 6,917,351 B1 | 7/2005 | Wedding et al. |
| 6,930,442 B2 | 8/2005 | Awamoto et al. |
| 6,932,664 B2 | 8/2005 | Yamada et al. |
| 6,935,913 B2 | 8/2005 | Wyeth et al. |
| 6,937,692 B2 | 8/2005 | Johnson et al. |
| 6,969,292 B2 | 11/2005 | Tokai et al. |
| 6,975,068 B2 | 12/2005 | Green et al. |
| 7,005,793 B2 | 2/2006 | George et al. |
| 7,025,648 B2 | 4/2006 | Green et al. |
| 7,045,788 B2 | 5/2006 | Iwatschenko-Borho et al. |
| 7,049,748 B2 | 5/2006 | Tokai et al. |
| 7,083,681 B2 | 8/2006 | Yamada et al. |
| 7,122,961 B1 | 10/2006 | Wedding |
| 7,125,305 B2 | 10/2006 | Green et al. |
| 7,126,148 B2 | 10/2006 | Murray et al. |
| 7,137,857 B2 | 11/2006 | George et al. |
| 7,140,941 B2 | 11/2006 | Green et al. |
| 7,157,854 B1 | 1/2007 | Wedding |
| 7,176,628 B1 | 2/2007 | Wedding |
| 7,208,203 B2 | 4/2007 | Yamada et al. |
| 7,247,989 B1 | 7/2007 | Wedding |
| 7,288,014 B1 | 10/2007 | George et al. |

| | | | | | |
|---|---|---|---|---|---|
| 7,307,602 | B1 | 12/2007 | Wedding et al. | 2004/0027269 A1 2/2004 Howard | |
| 7,332,726 | B2 | 2/2008 | Friedman et al. | FOREIGN PATENT DOCUMENTS | |
| 7,351,982 | B2 | 4/2008 | Hofstetter et al. | | |
| 7,375,342 | B1 | 5/2008 | Wedding | WO WO 2007/001582 1/2007 | |
| 2001/0028216 | A1* | 10/2001 | Tokai et al. ............ 313/496 | WO WO 2007/044068 4/2007 | |
| 2003/0226971 | A1* | 12/2003 | Chandross et al. ...... 250/361 R | * cited by examiner | |

Electrode Structure

Top View

Section A-A View

Section B-B View

Perspective View
Pass Through Radiation Sensor

Perspective View
Pass Through Radiation Sensor

Radiation detection paddle/wand

Radiation Detection Probe

PLASMA-TUBE RADIATION DETECTOR

RELATED APPLICATIONS

Priority is claimed under 35 U.S.C. 119(e) for Provisional Patent Application Ser. No. 60/782,522 filed Mar. 16, 2006.

FIELD OF THE INVENTION

This invention relates to detector apparatus and method using a gas discharge plasma display panel (PDP). This invention particularly relates to using a PDP as means of detecting radiation especially ionizing radiation from a nuclear source. The PDP used in the practice of this invention comprises one or more Plasma-tubes. The Plasma-tube may be of any suitable geometric shape. Each hollow Plasma-tube is filled with an ionizable gas and comprises a multiplicity of pixels or subpixels in a gas discharge plasma display panel (PDP) device. The Plasma-tube may be used in combination with a Plasma-shell, which includes Plasma-sphere, Plasma-disc, and Plasma-dome.

INTRODUCTION

In accordance with this invention, a novel gas-filled gamma radiation detecting device is comprised of an array of thin transparent gas encapsulated Plasma-tubes positioned on a suitable support such as a substrate, base, or elongated rod. Each Plasma-tube comprises multiple gas discharge pixel sites for individually and collectively detecting radiation. The detection device comprises a detection array of Plasma-tubes. The Plasma-tube detector has unique advantages over existing technologies. Some of these advantages include:

- Rugged—Unlike plastic (organic) scintillators found in existing technologies, Plasma-tubes may be composed of inorganic material that do not deteriorate under high energy, moisture, and/or temperature as is found in organic scintillators. Plasma-tubes made from inorganic materials are extremely durable and can withstand high-pressure extremes, shock, and/or vibration. Although they are inorganic and transmissive, they are not subject to chipping or fracture as are the mica windows of a Geiger counter.
- Large Substrate—Plasma-tubes are relatively thin with a multiplicity of pixels as detectors. A matrix array of Plasma-tubes can be positioned on very large substrates.
- Flexible—Because the Plasma-tubes encapsulate the gas, the supporting substrate does not have to be rigid or impermeable to gas. The substrate may be made out of a variety of materials including rigid or flexible materials. Likewise, there may be used a rigid or bendable elongated rod for probing.
- Directional—Having a large area matrix without collimation allows for more uniform sensitivity over the entire length and breadth of the tested object, and provides rough localization information based on highest count activity.
- Radiation Discrimination—Arrays of Plasma-tubes may be stacked between layers of increasingly dense material to discriminate between intensity of radiation. If Plasma-tubes are filled with helium such as helium-3, a neutron detector layer may also be incorporated into the device. The Plasma-tube configurations allow for novel electrical control of the firing threshold of the shells. Controlling the firing threshold in the presence of incident gamma radiation allows inferences to be made about the energy level.
- Low Cost Advanced Manufacturing Techniques—The Plasma-tube detector may be produced with low cost fabrication methods including roll-to-roll processes and web based manufacturing processes employing advanced manufacturing techniques.
- Versatile—Because of its large size, ruggedness, and flexibility, the Plasma-tube detector is ideal for portal applications. Because it is lightweight and low cost, it may also be used in hand held applications.

In one embodiment, this invention provides Plasma-tube arrays for use as Gamma radiation portal detectors. This invention offers significant advantages over prior art detection devices including plastic scintillation devices and gas radiation detectors such as Geiger-Muller counters, and wire chamber systems.

Plastic Scintillation Detectors

The predominant technology currently used in radiation portal detectors is plastic scintillation devices. These devices rely on organic substances including polystyrene (PS) and polyvinyl toluene (PVT) to excite and emit light as a charged particle is passed through the material. In general, about 3% of the energy that passes through the organic material is converted to light. This light is then collected by a photomultiplier tube and converted to an electrical signal. The plastic scintillator device is used in portal applications because it is easy to fabricate and it can be made large. However, it has some disadvantages:

- Aging and Handling: Plastic scintillators are subject to aging which diminishes the light yield. Exposure to solvent vapors, high temperatures, mechanical flexing, irradiation, or rough handling will aggravate the process. A particularly fragile region is the surface, which can "craze" and/or develop microcracks that rapidly destroy the capability of plastic scintillators to transmit light by total internal reflection. Crazing typically occurs where oils, solvents, or fingerprints have contacted the surface.
- Attenuation or Loss of Efficiency: A number of factors affect the transmission efficiency of the light. The first loss is due to Stokes shift. This is the conversion of high-energy photons to lower-energy photons. Other losses occur due to the concentration of fluors (the higher the concentration of a fluor, the greater will be its self-absorption); the optical clarity and uniformity of the bulk material; the quality of the surface; and absorption by additives, such as stabilizers, which may be present.
- Afterglow: Plastic scintillators have a long-lived luminescence, which does not follow a simple exponential decay. Intensities at the $10^{-4}$ level of the initial fluorescence can persist for hundreds of nanoseconds (ns).
- Atmospheric quenching: Plastic scintillators will decrease their light yield with increasing partial pressure of oxygen. This can be a 10% effect in an artificial atmosphere. Other gases may have similar quenching effects.
- Magnetic field: The photo multiplier tubes often used are very sensitive to magnetic fields.
- Radiation damage: Irradiation of plastic scintillators creates color centers, which absorb light more strongly in the UV and blue than at longer wavelengths. This effect appears as a reduction both of light yield and attenuation length. Radiation damage depends not only on the integrated dose, but also on the dose rate, atmosphere, and temperature, before, during and after irradiation, and a number of other factors.

Gas Radiation Detectors

Gas radiation detectors are primarily inorganic devices and thus are not subject to the life concerns associated with the plastic scintillation devices. The most common gas radiation detector is the Geiger-Muller tube. It is usually a hand held device, and not generally used in portal applications. The Geiger-Muller tube is constructed with a wire anode concentric with a metal (e.g. iron) cylinder and filled with gas at less than atmospheric pressure. Radiation enters the chamber through a mica window. A voltage potential is maintained between the inner electrode and the concentric cylinder such that any particle capable of ionizing a single atom of the filling gas of the tube will initiate an avalanche of ionization in the tube. The electrical field around the anode wire is very high and avalanching takes place around it. The collection of the ionization thus produces results in the formation of a pulse of voltage at the output of the tube. The amplitude of this pulse, on the order of about one volt, is sufficient to operate the scaler circuit with little further amplification. However, the pulse amplitude is largely independent of the properties of the particle detected and can therefore give little information as to the nature of the particle. In spite of this limitation, the Geiger-Muller tube is a versatile device and may be used for counting alpha particles, beta particles, and gamma rays. Variations of the Geiger-Muller detector are gas wire detectors. These include MicroStrip Gas Chamber (MSGC), the MicroGap Chamber (MGC), and the Gas Electron Multiplier (GEM). They differ from the Geiger-Muller tube in that the gas is enveloped by two planar substrates. A matrix of anode and cathode structures form an array within the gas envelope. Because of the anode cathode structure, the gas wire detectors have the ability to somewhat limit the drift length of the ionized gas particles as compared to the Geiger-Muller counter. This allows for greater detection speed and sensitivity. The gas wire detectors are also an improvement over the standard Geiger-Muller counter in that they have a larger detection area. However, gas wire detectors are limited as to size because it becomes impractical to maintain the spacing between the two substrates over a large area.

Plasma-Tube Portal Detector

In accordance with this invention, the Plasma-tube radiation detector may be used in portal applications. The Plasma-tube detector is similar to the gas radiation wire detector except that gas is encapsulated in little shells instead of between two substrates. This allows for low cost fabrication of large area, rugged, flexible arrays. It also provides for isolation between ionizing gas matrix detection sites. Additionally, the flexibility and novel architecture of the system allow for important and interesting improvements including low cost conformable Plasma-tube detectors and the ability to distinguish between various types of radiation including beta, gamma, and neutron.

A Plasma-tube is a hollow gas encapsulating elongated body and may contain a variety of gas mixtures at controlled pressure. The Plasma-tube may be layered with a number of different materials including MgO (a good secondary electron emitter) on the inner surface. The use of coatings with materials having specific k-shell electron binding energies may be used for increased sensitivity at certain photon energies. The Plasma-tubes are produced with materials and qualities beneficial for the detection of radiation and applied to a rigid or flexible substrate. Electrodes provide AC voltage across the Plasma-tube to keep the gas close to the ionization voltage. Any charged particle passing through the Plasma-tube will ionize the gas and cause a slight voltage drop at the electrodes. This is detected with appropriate circuitry. Additionally, when a dip in the voltage is sensed at a Plasma-tube or group of Plasma-tubes, the electronics selectively "reset" these Plasma-tubes, such that they do not become saturated thereby allowing them to continue to detect. In regards to shell geometry and electrodes, a number of configurations are possible.

The Plasma-tube detector overcomes limitation inherent in prior technologies allowing for large conformable arrays shaped like domes, tunnels or other configurations through which people, luggage, automobiles, trucks and even trains may pass. Additionally, the Plasma-tube detector allows for discrimination between various energy particles. This may be achieved by stacking the layers of arrays between various blocking materials. Additionally it is possible to determine the energy range of incident photons by adjusting the threshold voltage of the sustain pulse. Table 1 below compares Plastic Scintillators, Gas wire detectors and Plasma-tube detectors.

TABLE 1

| | Plastic Scintillation | Gas Wire | Plasma-tube |
|---|---|---|---|
| Large size arrays | Yes | No | Yes |
| Conformable/flexible | Yes | No | Yes |
| Low cost fabrication | Yes | No | Yes |
| Aging not accelerated by temperature extremes | No | Yes | Yes |
| Aging not accelerated by radiation | No | Yes | Yes |
| Aging not accelerated by moisture | No | Yes | Yes |
| Simple path to radiation discrimination | — | — | Yes |

Table 2 below shows various gases at standard temperature and pressure (STP), the yield of ionization encounters, the T99 thickness of the gas layer for 99% efficiency, and the average number of free electrons produced by a minimum ionization particle.

TABLE 2

| | Encounter per cm | T99 (mm) | Free Electrons Produced (cm) |
|---|---|---|---|
| He | 5 | 9.2 | 16 |
| Ne | 12 | 3.8 | 42 |
| Ar | 25 | 1.8 | 103 |
| Xe | 46 | 1.0 | 304 |
| $CH_4$ | 27 | 1.7 | 62 |
| $CO_2$ | 35 | 1.3 | 107 |
| $C_2H_4$ | 43 | 1.1 | 113 |

As shown in Table 2, pure Xe is a very efficient gas in terms of average encounters and number of electrons produced. Additionally, the depth of 1 mm, to achieve 99% efficiency is within the size range of the Plasma-tubes. Although it is possible to quench or "reset" each pixel individually, it is typically not necessary to add a quenching gas such as oxygen. However, a quenching gas may be used as needed. Furthermore, the addition of a secondary electron emitter such as MgO will increase the efficiency. The shell material is composed of a very thin inorganic glass material with a thickness of about 40-60 microns, where 25.4 microns equal one mil (0.001 inch).

Substrate

The Plasma-tubes may be applied to a number of rigid or flexible supports including flat or curved substrate or base configurations. The support may comprise rigid or flexible elongated rods for probing. These substrates typically have primarily the same size anode and cathode at each Plasma-tube site. Prior art gas wire detectors are typically fabricated with a thin anode and a thick cathode. The thin anode acts like a lighting rod and focuses the charge into a concentrated area. This improves the sensitivity of the system. However, these gas wire detectors are DC based whereas the Plasma-tube detector of this invention is AC based. Asymmetric electrodes may also improve the operation of the Plasma-tube detector.

Electronics

There is a variety of electronics to drive arrays of Plasma-tubes. These electronics have been designed to drive Plasma-tube arrays as displays. However, these electronics are readily adaptable to a radiation detection application. The electronics generate write pulses, sustain pulses, and erase pulses. A write pulse causes a gas discharge and light output from a Plasma-tube. An erase pulse extinguishes the gas discharge and stops light output. A sustain pulse keeps a Plasma-tube in the state of status quo. For this application, the sustain pulse is raised to just below the threshold voltage necessary to light a Plasma-tube. Radiation from an exterior source will cause the gas to break down and the Plasma-tube will light. A lit Plasma-tube draws slightly more current then a non-lit Plasma-tube. A circuit is provided to detect the additional current draw from lit Plasma-tubes. An erase pulse can be used to reset lit Plasma-tubes to the "off" or quenched state.

Sensitivity

The sensitivity of a single Plasma-tube will depend on the sustain voltage. The higher the sustain voltage, the more sensitive the Plasma-tube will be. By changing the threshold of the sustain voltage in the presence of a radiation source, discrimination between different gamma radiation energy levels may be detectable. The discrimination sensitivity will be determined. The electronics can detect a change of current over a one-inch square array thereby allowing sufficient resolution for a large area detector of about 4 feet by 8 feet. The timing of the erase or quench pulse can be varied. The capability of programming the timing of the quench pulse with a Plasma-tube will help overcome the system saturation that may occur in all gas detectors when subjected to strong radiating environments.

PDP BACKGROUND OF INVENTION

PDP Structures and Operation

In a gas discharge plasma display panel (PDP), a single addressable picture element is a cell, sometimes referred to as a pixel. In a multicolor PDP, two or more cells or pixels may be addressed as sub-cells or subpixels to form a single cell or pixel. As used herein cell or pixel means sub-cell or subpixel. The cell or pixel element is defined by two or more electrodes positioned in such a way so as to provide a voltage potential across a gap containing an ionizable gas. When sufficient voltage is applied across the gap, the gas ionizes to produce light. In an AC gas discharge plasma display, the electrodes at a cell site are coated with a dielectric. The electrodes are generally grouped in a matrix configuration to allow for selective addressing of each cell or pixel. To form a display image, several types of voltage pulses may be applied across a plasma display cell gap. These pulses include a write pulse, which is the voltage potential sufficient to ionize the gas at the pixel site. A write pulse is selectively applied across selected cell sites. The ionized gas will produce visible light, or UV light, which excites a phosphor to glow. Sustain pulses are a series of pulses that produce a voltage potential across pixels to maintain ionization of cells previously ionized. An erase pulse is used to selectively extinguish ionized pixels. The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display it is desired that the various physical parameters adhere to required tolerances. Maintaining the required tolerance depends on cell geometry, fabrication methods and the materials used. The prior art discloses a variety of plasma display structures, a variety of methods of construction, and materials. Examples of open cell gas discharge (plasma) devices include both monochrome (single color) AC plasma displays and multi-color (two or more colors) AC plasma displays. Also monochrome and multicolor DC plasma displays are contemplated. Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay), and 4,126,807 (Wedding), all incorporated herein by reference. Examples of multicolor AC plasma displays are well known in the prior art and include those disclosed in U.S. Pat. Nos. 4,233,623 (Pavliscak), 4,320,418 (Pavliscak), 4,827,186 (Knauer et al.), 5,661,500 (Shinoda et al.), 5,674,553 (Shinoda, et al.), 5,107,182 (Sano et al.), 5,182,489 (Sano), 5,075,597 (Salavin et al.), 5,742,122 (Amemiya, et al.), 5,640,068 (Amemiya et al.), 5,736,815 (Amemiya), 5,541,479 (Nagakubi), 5,745,086 (Weber) and 5,793,158 (Wedding), all incorporated herein by reference. This invention may be practiced in a DC gas discharge (plasma) display which is well known in the prior art, for example as disclosed in U.S. Pat. Nos. 3,886,390 (Maloney et al.), 3,886,404 (Kurahashi et al.), 4,035,689 (Ogle et al.), and 4,532,505 (Holz et al.), all incorporated herein by reference. This invention will be described with reference to an AC plasma display. The PDP industry has used two different AC plasma display panel (PDP) structures, the two-electrode columnar discharge structure and the three-electrode surface discharge structure. Columnar discharge is also called co-planar discharge.

Columnar PDP

The two-electrode columnar or co-planar discharge plasma display structure is disclosed in U.S. Pat. Nos. 3,499,167 (Baker et al.) and 3,559,190 (Bitzer et al.) The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate. The columnar discharge PDP structure has been widely used in monochrome AC plasma displays that emit orange or red light from a neon gas discharge. Phosphors may be used in a monochrome structure to obtain a color other than neon orange. In a multi-color columnar discharge PDP structure as disclosed in U.S. Pat. No. 5,793,158 (Wedding), phosphor stripes or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP. In a two electrode columnar discharge PDP as disclosed by Wedding ('158), each light-emitting pixel is defined by a gas discharge between a bottom or rear electrode x and a top or front opposite electrode y, each cross-over of the two opposing arrays of bottom electrodes x and top electrodes y defining a pixel or cell.

Surface Discharge PDP

The three-electrode multi-color surface discharge AC plasma display panel structure is widely disclosed in the prior art including U.S. Pat. Nos. 5,661,500 (Shinoda et al.), 5,674,553 (Shinoda et al.), 5,745,086 (Weber), and 5,736,815 (Amemiya), all incorporated herein by reference. In a surface discharge PDP, each light-emitting pixel or cell is defined by the gas discharge between two electrodes on the top substrate. In a multi-color RGB display, the pixels may be called sub-pixels or sub-cells. Photons from the discharge of an ionizable gas at each pixel or subpixel excite a photoluminescent phosphor that emits red, blue, or green light. In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also called a row sustain electrode because of its dual functions of address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate. In a three-electrode surface discharge AC plasma display panel, the sustaining voltage and resulting gas discharge occurs between the electrode pairs on the top or front viewing substrate above and remote from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode. Because the phosphor is spaced from the discharge between the two electrodes on the top substrate, the phosphor is subject to less electron bombardment than in a columnar discharge PDP.

Single Substrate PDP

There may be used a PDP structure having a so-called single substrate or monolithic plasma display panel structure having one substrate with or without a top or front viewing envelope or dome. Single-substrate or monolithic plasma display panel structures are well known in the prior art and are disclosed by U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all incorporated herein by reference.

RELATED PRIOR ART

Spheres, Beads, Ampoules, Capsules

The construction of a PDP out of gas-filled hollow microspheres is known in the prior art. Such microspheres are referred to as spheres, beads, ampoules, capsules, bubbles, shells, and so forth. The following prior art relates to the use of microspheres in a PDP and are incorporated herein by reference.

U.S. Pat. No. 2,644,113 (Etzkorn) discloses ampoules or hollow glass beads containing luminescent gases that emit a colored light. In one embodiment, the ampoules are used to radiate ultraviolet light onto a phosphor external to the ampoule itself. U.S. Pat. No. 3,848,248 (MacIntyre) discloses the embedding of gas-filled beads in a transparent dielectric. The beads are filled with a gas using a capillary. The external shell of the beads may contain phosphor. U.S. Pat. No. 3,998,618 (Kreick et al.) discloses the manufacture of gas-filled beads by the cutting of tubing. The tubing is cut into ampoules (shown as domes in FIG. 2) and heated to form shells. The gas is a rare gas mixture, 95% neon and 5% argon at a pressure of 300 Torr. U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture, which emits a color upon discharge, and/or by using a glass shell made from colored glass. U.S. Pat. No. 4,963,792 (Parker) discloses a gas discharge chamber including a transparent dome portion. U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen. Japanese Patent 11238469A, (Yoshiaki) discloses a plasma display panel containing a gas capsule. The gas capsule is provided with a rupturable part, which ruptures when it absorbs a laser beam.

RELATED PRIOR ART

Light Emitting Elements

U.S. Pat. No. 6,545,422 (George et al.) discloses a light-emitting plasma display panel with a plurality of sockets with spherical or other shape micro-components in each socket sandwiched between two substrates. The micro-component includes a shell filled with a plasma-forming gas or other material. The light-emitting panel may be a plasma display, electroluminescent display, or other display device.

The following U.S. Patent Nos. issued to George et al. and the various joint inventors are incorporated herein by reference: U.S. Pat. Nos. 6,570,335 (George et al.), 6,612,889 (Green et al.), 6,620,012 (Johnson et al.), 6,646,388 (George et al.), 6,762,566 (George et al.), 6,764,367 (Green et al.), 6,791,264 (Green et al.), 6,796,867 (George et al.), 6,801,001 (Drobot et al.), 6,822,626 (George et al.), 6,902,456 (George et al.), 6,935,913 (Wyeth et al.), 6,975,068 (Green et al.), 7,005,793 (George et al.), 7,025,648 (Green et al.), 7,125,305 (Green et al.), and 7,137,857 (George et al.).

Also incorporated herein by reference are the following U.S. Patent Application Publications filed by the various joint inventors of George et al.: U.S. Patent Application Publication Nos. 2004/0063373 (Johnson et al.), 2005/0095944 (George et al.), 2006/0097620 (George et al.), and 2006/0205311 (Green et al.).

Also incorporated herein by reference is U.S. Pat. No. 6,864,631 (Wedding), which discloses a PDP comprised of microspheres filled with ionizable gas.

RELATED PRIOR ART

PDP Tubes

The following prior art references relate to the use of elongated tubes in a PDP and are incorporated herein by reference.

U.S. Pat. No. 3,602,754 (Pfaender et al.) discloses a multiple discharge gas display panel in which filamentary or capillary size glass tubes are assembled to form a gas discharge panel. U.S. Pat. Nos. 3,654,680 (Bode et al.), 3,927,342 (Bode et al.) and 4,038,577 (Bode et al.) disclose a gas discharge display in which filamentary or capillary size gas tubes are assembled to form a gas discharge panel. U.S. Pat. No. 3,969,718 (Strom) discloses a plasma display system utilizing tubes arranged in a side-by-side, parallel fashion. U.S. Pat. No. 3,990,068 (Mayer et al.) discloses a capillary tube plasma display with a plurality of capillary tubes arranged parallel in a close pattern. U.S. Pat. No. 4,027,188 (Bergman) discloses a tubular plasma display consisting of parallel glass capillary tubes sealed in a plenum and attached to a rigid substrate. U.S. Pat. No. 5,984,747 (Bhagavatula et al.) discloses rib structures for containing plasma in electronic displays are formed by drawing glass preforms into fiber-like rib components. The rib components are then assembled to form rib/channel structures suitable for flat panel displays. U.S. Patent Application Publication 2001/0028216A1 (Tokai et al.) discloses a group of elongated illuminators in a gas discharge device. U.S. Pat. No. 6,255,777 (Kim et al.) and U.S. Patent Application Publication 2002/0017863 (Kim et al.) of Plasmion disclose a capillary electrode discharge PDP device and a method of fabrication. The following U.S. Patent Nos. disclose PDP structures with elongated display tubes and are incorporated herein by reference: U.S. Pat. Nos. 6,914,382 (Ishimoto et al.), 6,893,677 (Yamada et al.), 6,857,923 (Yamada et al.), 6,841,929 (Ishimoto et al.), 6,836,064 (Yamada et al.), 6,836,063 (Ishimoto et al.), 6,794,812 (Yamada et al.), 6,677,704 (Ishimoto et al.), 6,650,055 (Ishimoto et al.), 6,633,117 (Shinoda et al.), 6,930,442 (Awamoto et al.), 6,932,664 (Yamada et al.), 6,969,292 (Tokai et al.), 7,049,748 (Tokai et al.), and 7,083,681 (Yamada et al.).

The following U.S. Patent Application Publications by Fujitsu Ltd. of Kawasaki, Japan disclose PDP structures with elongated display tubes and are incorporated herein by reference: U.S. Patent Application Publication Nos. 2004/0033319 (Yamada et al.) and 2003/0182967 (Tokai et al.).

As used herein elongated tube is intended to include capillary, filament, filamentary, illuminator, hollow rods, or other such terms. It includes an elongated enclosed gas-filled structure having a length dimension that is greater than its cross-sectional width dimension. The width of the tube is typically the viewing direction of the display. Also as used herein, an elongated Plasma-tube has multiple gas discharge pixels of 100 or more, typically 500 to 1000 or more, whereas a Plasma-shell typically has only one gas discharge pixel. In some special embodiments, the Plasma-shell may have more than one pixel, i.e., 2, 3, or 4 pixels up to 10 pixels. The U.S. Patent Nos. issued to George et al. and listed herein as related microsphere prior art also disclose elongated tubes and are incorporated herein by reference.

RELATED PRIOR ART

Radiation Detectors

Radiation detectors are well known in the prior art including gas-filled detectors. The following prior art relates to radiation detectors and are incorporated herein by reference: U.S. Patent Nos. 3,110,835 (Richter et al.), 4,201,692 (Christophorou et al.), 4,309,307 (Christophorou et al.), 4,553,062 (Ballon et al.), 4,855,889 (Blanchot et al.), 5,905,262 (Spanswick), U.S. Patent Application Publication 2004/0027269 (Howard), and WO 98/28635 (Koster et al.).

RELATED PRIOR ART

Plasma Panel as Radiation Detector

The prior art has disclosed the use of a plasma panel as a radiation detector. For example, such a device is disclosed in the light-emitting element patents of George et al. and his joint inventors listed above and incorporated herein by reference. Such a device is also disclosed in U.S. Patent Application Publication 2006/0049362, filed Jun. 20, 2005, also incorporated herein by reference.

SUMMARY OF INVENTION

This invention relates to detector apparatus and method comprising a PDP constructed out of one or more elongated Plasma-tubes. The Plasma-tube may be of any suitable geometric shape. Contemplated cross-sectional shapes include, circle, ellipse, oval, triangle, square, rectangle, pentagon, hexagon, and so forth. The PDP comprises one or more Plasma-tubes on or within a rigid or flexible substrate with each Plasma-tube being electrically connected to electrical conductors such as electrodes. In accordance with one embodiment of this invention, insulating barriers may be used to prevent contact between the electrodes. This invention is disclosed herein with Plasma-tubes alone or in combination with Plasma-shells. As used herein, Plasma-shell includes Plasma-sphere, Plasma-disc, and/or Plasma-dome.

A Plasma-sphere is a primarily hollow sphere with relatively uniform shell thickness. The shell is typically composed of a dielectric material. It is filled with an ionizable gas at a desired mixture and pressure. The gas is selected to produce visible, UV, and/or infrared discharge when a voltage is applied. The shell material is selected to optimize dielectric properties and optical transmissivity. Additional beneficial materials may be added to the inside or outer surface of the sphere including magnesium oxide for secondary electron emission. The magnesium oxide and other materials including organic and/or inorganic luminescent substances may also be added directly to the shell material.

A Plasma-disc is similar to the Plasma-sphere in material composition and gas selection. It differs from the Plasma-sphere in that it is flattened on two opposing sides such as both the top and bottom or the front and the back. A Plasma-sphere or sphere may be flattened on opposing sides to form a Plasma-disc by applying heat and pressure simultaneously to the top and bottom of the sphere using two substantially flat and ridged members, either of which may be heated. Each of the other four sides or ends may be flat or round.

A Plasma-dome is similar to a Plasma-sphere in material composition and ionizable gas selection. It differs in that one side is domed. A Plasma-sphere is flattened on one or more other sides to form a Plasma-dome, typically by applying heat and pressure simultaneously to the top and bottom of the Plasma-sphere or sphere using one substantially flat and ridged member and one substantially elastic or dome curved member. In one embodiment, the substantially rigid member is heated. A Plasma-dome may also be made by cutting an elongated tube as shown in U.S. Pat. No. 3,998,618 (Kreick et al.) incorporated herein by reference

DETAILED DESCRIPTION OF THE DRAWINGS

In accordance with this invention, there is provided PDP radiation detector apparatus and method utilizing Plasma-tubes arranged in an array or in other suitable configuration. As illustrated herein, conductors or electrodes are electrically connected to a Plasma-tube located within or on a rigid or flexible substrate or other body, by means of an electrically conductive or insulating dielectric bonding substance applied to the substrate or to each Plasma-tube. In one embodiment, each electrical connection to each Plasma-tube is separated from each other electrical conductive bonding substance connection on the Plasma-tube by an insulating bather so as to prevent the conductive substance forming one electrical connection from flowing and electrically shorting out another electrical connection. The Plasma-tube may be of any suitable geometric shape and may be used in combination with a Plasma-shell including a Plasma-sphere, Plasma-dome, or Plasma-disc. In the practice of this invention, there may be used a PDP comprised of one or more Plasma-tubes alone or in combination with one or more other Plasma-tube geometric shapes. Luminescent material may be positioned near or on each Plasma-tube to provide or enhance light output.

Electrode Structure

Figure 1:
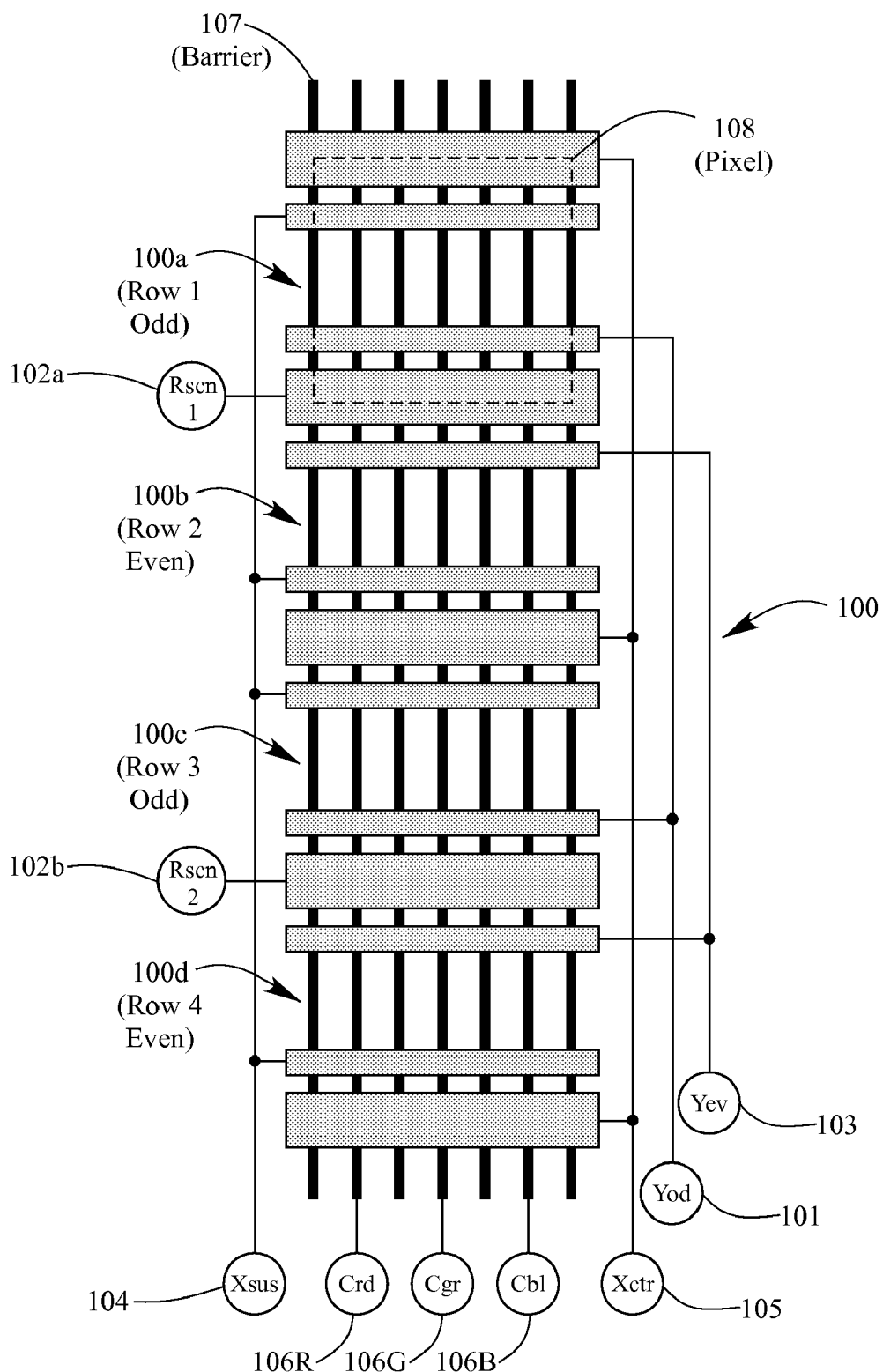
FIG. 1 illustrates an overview of an AC plasma display panel electrode structure with positive column discharge.

FIG. 1 shows the electrode structure for an AC plasma display 100 with odd and even rows 100a, 100b, 100c, and 100d and a multiplicity of pixels or subpixels 108 to be operated in the positive column discharge mode in accordance with this invention. Each row has a wide separation between the X sustain (Xsus) 104 and Y odd (Yod) 101 or Y even (Yev) 103 sustain electrodes for the positive column gas discharge sustaining. Row scan electrodes (Rscn) 102a and 102b are positioned between Yod 101 and Yev 103 sustain electrodes. The X Center electrodes (Xctr) 105 are located in the space between the adjacent Xsus 104 electrodes. High dark room contrast ratio is made possible by covering the area between rows with horizontal black stripes (not shown). These stripes mask unwanted light output from setup and addressing discharges.

Column Data electrodes 106R, 106B, and 106G are used in addressing each subpixel. Full color RGB is addressed by the Column Data electrode (Crd) 106R (red), Column Data electrode (Cgr) 106G (green) and Column Data electrode (Cbl) 106B (blue). Also shown in FIG. 1 are barriers 107 that separate the subpixels. The Row Scan electrodes 102 and Column Data electrodes 106 R, 106B, and 106G are the addressing electrodes. In this embodiment, the wide Row Scan electrodes 102a and 102b have a greater area facing to the Column Data electrodes 106 R, 106B, and 106G, which reduce the discharge delay. The addressing electrodes are separate from and driven independently from sustain X and Y electrodes. Therefore this embodiment is an independent sustain/address type. All electrodes whose drive voltage pulses are in opposition have their electrode connections to opposite sides of the panel.

Figure 2A:
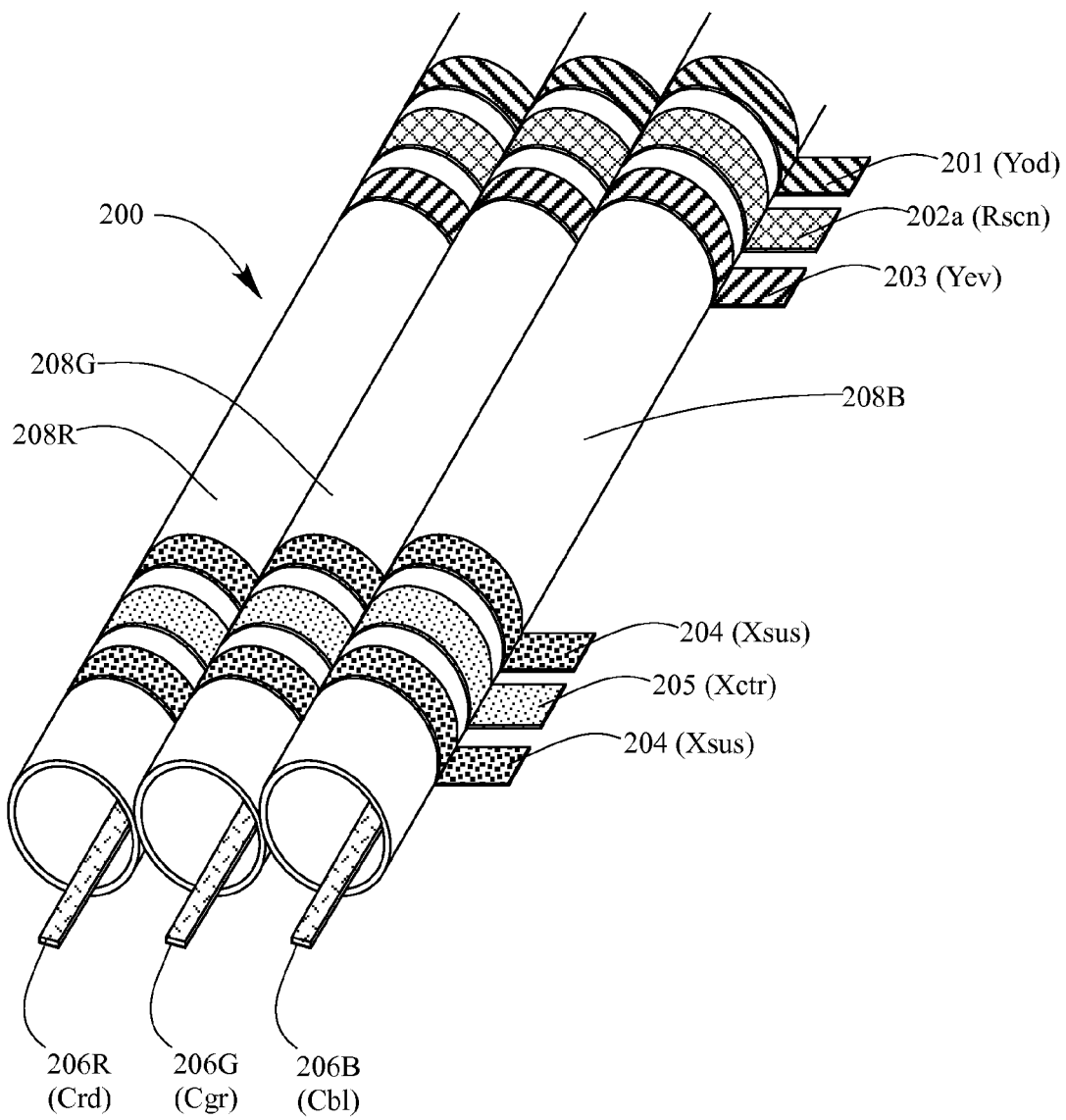
FIG. 2A illustrates the electrode structure for an AC plasma display pixel using tabulations.

FIG. 2A shows a tubular PDP electrode structure 200 that illustrates a reduced portion of FIG. 1. As shown there are three tubes 208R, 208G, 208B filled with ionizable gas to define RGB pixels or subpixels. The RGB subpixels may be defined by a luminescent material located inside or outside each designated tube 208R, 208G, 208B. Each tube may contain a color gas such as an excimer and/or made from a color material such as tinted glass. The display's row sustain electrodes, consisting of X sustain (Xsus) 204 and opposing Y odd (Yod) 201 or Y even (Yev) 203 sustain electrodes, have a distance separation between them. The separation is sufficient to allow positive column gas discharge sustaining, typically 800 microns or more. Row scan electrodes (Rscn) 202a are positioned between Yod 201 and Yev 203 sustain electrodes. The X Center electrodes (Xctr) 205 are in the space between the Xsus electrodes 204. During the setup or conditioning period plasma discharges produce unwanted light output at these electrodes. Also, during the addressing period unwanted light is produced at the Row Scan electrodes (Rscn) 202a. While the X Center electrodes (Xctr) 205 and Row Scan electrodes (Rscn) 202a mask out a substantial portion of this unwanted light, further improvement is made possible by the addition of horizontal black stripes (not shown) covering the area between the display's rows. The masking out of unwanted light and the use of black stripes provides a very high contrast ratio for the display. Column Data electrodes 206R, 206G, 206B are used in addressing each subpixel. Full color RGB is addressed by (Crd) 206R (red), (Cgr) 206G (green) and (Cbl) 206B blue electrodes.

The Row Scan and Column Data electrodes are the display's addressing electrodes. In this design the wide Row Scan electrode has a greater area facing to the Column Data electrode, which reduces the discharge delay. The addressing electrodes are separate from and driven independently from sustain X and Y electrodes. Therefore this design is a true independent sustain/address type. All electrodes whose drive voltage pulses are in opposition make their electrode connections to opposite sides of the panel.

Figure 2B:
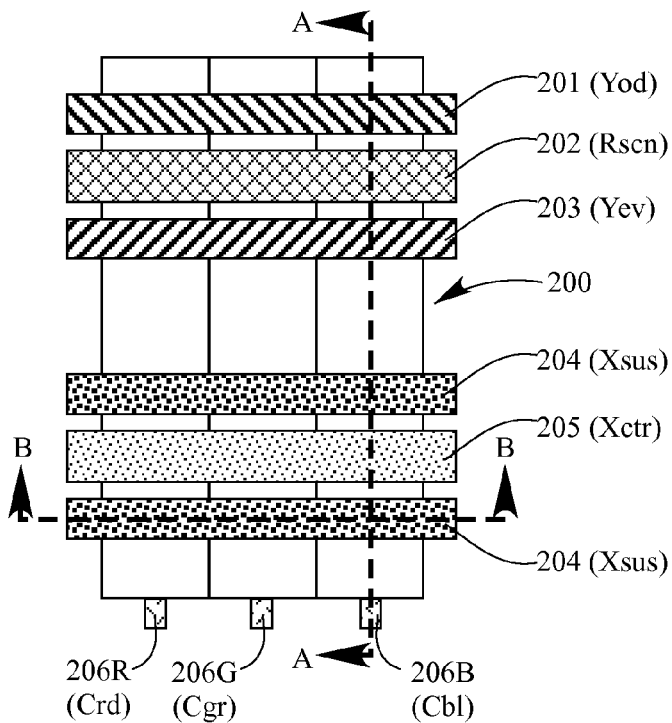
FIG. 2B illustrates the top view of the electrode structure of FIG. 2A.

FIG. 2B is a top view of a tubular PDP electrode structure 200 showing Y odd electrode 201, Row scan electrode 202, Y even electrode 203, X sustain electrode 204, X center electrode 205, and Column Data electrodes 206R, 206G, 206B.

Figure 2C:
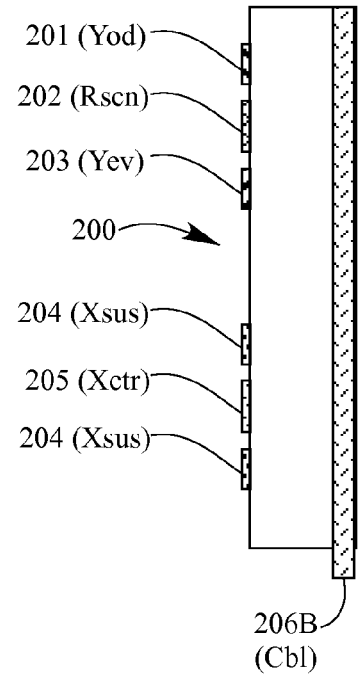
FIG. 2C illustrates a section A-A view of the structure of FIG. 2A.

FIG. 2C is a section A-A view of the tubular PDP electrode structure 200 seen in FIG. 2B. Shown are Y odd electrode 201, Row scan electrode 202, Y even electrode 203, X sustain electrode 204, X center electrode 205, and Column Data electrode 206B.

Figure 2D:
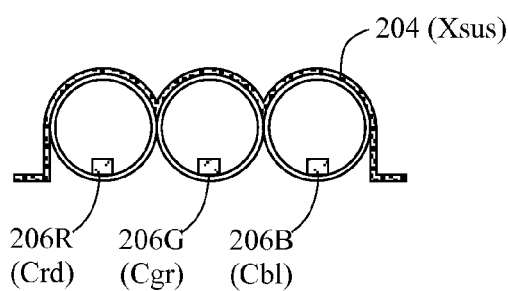
FIG. 2D illustrates a section B-B view of the structure of FIG. 2A.

FIG. 2D is a section B-B view of the tubular PDP electrode structure 200 seen in FIG. 2B. Shown are X sustain electrode 204 and Column Data electrodes 206R, 206G, 206B.

Drive Scheme

Figure 3:
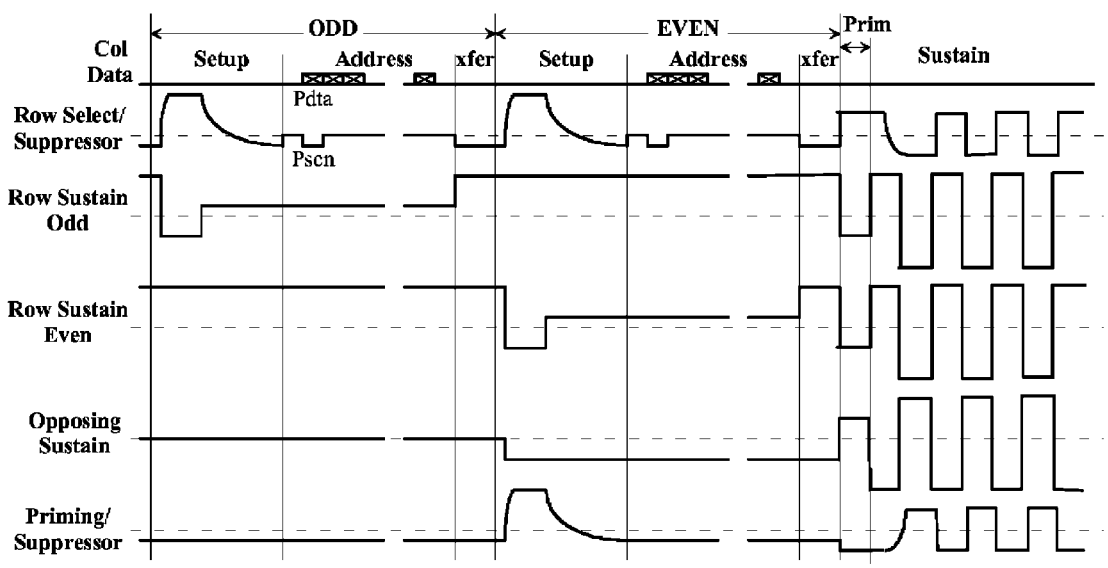
FIG. 3 illustrates drive waveforms for operating of a plasma display panel with positive column discharge.
Figure 4:
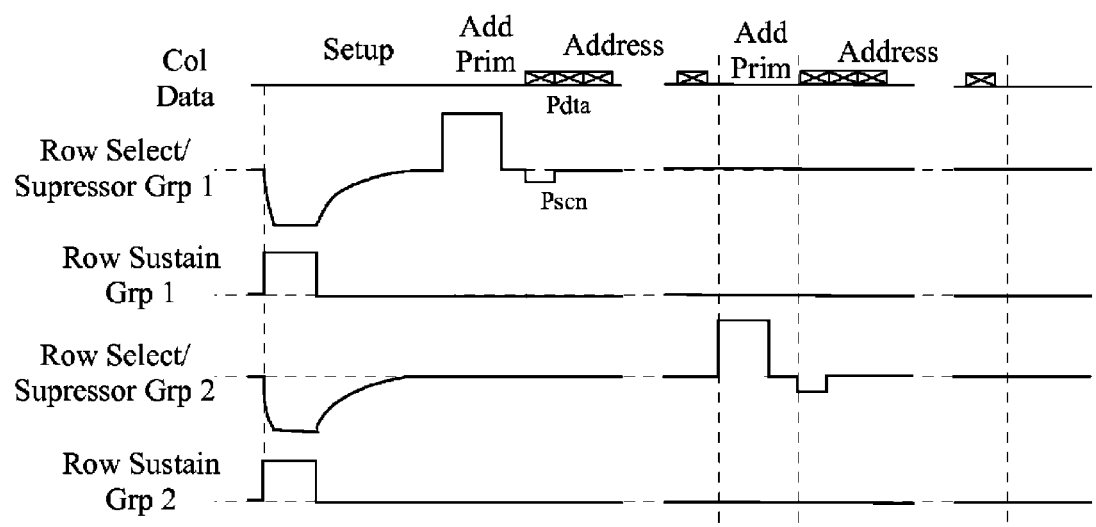
FIG. 4 illustrates address-priming waveforms.

FIGS. 3 and 4 show one set of driving waveforms. As shown in FIG. 3, the waveforms are divided into odd and even row periods consisting of setup (conditioning), selective erase-addressing operation and transfer. The X OFF Reset or conditioning period eliminates X sustain priming discharges in OFF cells. Last is the sustain period whose positive column gas discharge sustaining of ON cells produce the display light output.

Figure 5:
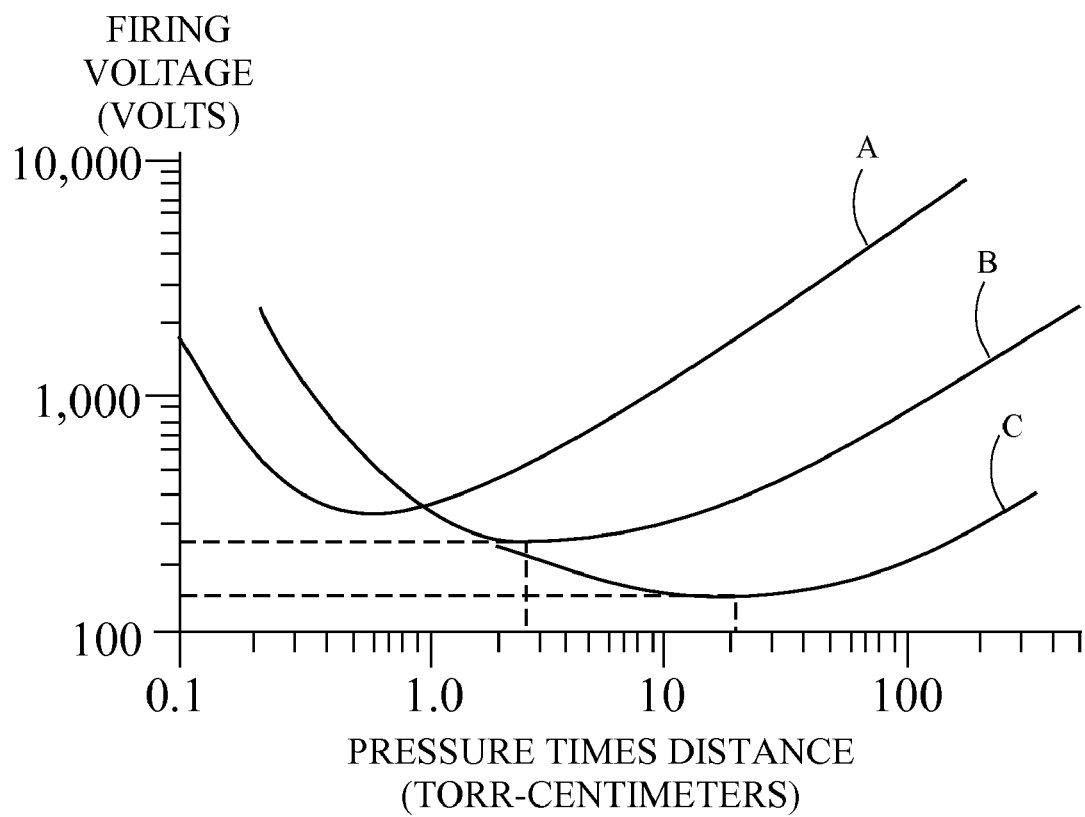
FIG. 5 shows hypothetical Paschen curves for three typical hypothetical gases.

The Plasma-tube is filled with an ionizable gas. Each gas composition or mixture has a unique curve associated with it, called the Paschen curve as illustrated in FIG. 5. The Paschen curve is a graph of the breakdown voltage versus the product of the pressure times the discharge distance. It is usually given in Torr-centimeters. As can be seen from the illustration in FIG. 5, the gases typically have a saddle region in which the voltage is at a minimum. Often it is desirable to choose pressure and gas discharge distance in the saddle region to minimize the voltage. In the case of a Plasma-sphere, the distance is the diameter of the sphere or some chord of the sphere as defined by the locating and positioning of the electrodes. In the case of each geometric shape, it is an axis across the geometric body selected for gas discharge as determined by the locating and positioning of the electrodes. In one embodiment, the inside of the Plasma-tube contains a secondary electron emitter. Secondary electron emitters lower the breakdown voltage of the gas and provide a more efficient discharge. Plasma displays traditionally use magnesium oxide for this purpose, although other materials may be used including other Group IIA oxides, rare earth oxides, lead oxides, aluminum oxides, and other materials. Mixtures of secondary electron emitters may be used. It may also be beneficial to add luminescent substances such as phosphor to the inside or outside of the sphere. In one embodiment and mode hereof, the Plasma-tube material is a metal or metalloid oxide with an ionizable gas of 99.99% atoms of neon and 0.01% atoms of argon or xenon for use in a monochrome PDP. Examples of shell materials include glass, silica, aluminum oxides, zirconium oxides, and magnesium oxides. In another embodiment, the Plasma-tube contains luminescent substances such as phosphors selected to provide different visible colors including red, blue, and green for use in a full color PDP. The metal or metalloid oxides are typically selected to be highly transmissive to photons produced by the gas discharge especially in the UV range. In one embodiment, the ionizable gas is selected from any of several known combinations that produce UV light including pure helium, helium with up to 1% atoms neon, helium with up to 1% atoms of argon and up to 15% atoms nitrogen, and neon with up to 15% atoms of xenon or argon. For a color PDP, red, blue, and/or green light-emitting luminescent substance may be applied to the interior or exterior of the sphere shell. The exterior application may comprise a slurry or tumbling process with curing, typically at low temperatures. Infrared curing can also be used. The luminescent substance may be applied by other methods or processes, which include spraying, ink jet, dipping, and so forth. Thick film methods such as screen-printing may be used. Thin film methods such as sputtering and vapor phase deposition may be used. The luminescent substance may be applied externally before or after the Plasma-tube is attached to the PDP substrate. As discussed hereinafter, the luminescent substance may be organic and/or inorganic. The internal or external surface of the Plasma-tube may be partially or completely coated with luminescent material. In one preferred embodiment the external surface is completely coated with luminescent material. The bottom or rear of the Plasma-tube may be coated with a suitable light reflective material in order to reflect more light toward the top or front viewing direction of the Plasma-tube. The light reflective material may be applied by any suitable process, such as spraying, ink jet, dipping, and so forth. Thick film methods such as screen-printing may be used. Thin film methods such as sputtering and vapor phase deposition may be used. The light reflective material may be applied over the luminescent material or the luminescent material may be applied over the light reflective material. In one embodiment, the electrodes are made of or coated with a light reflective material such that the electrodes also may function as a light reflector.

Figure 6:
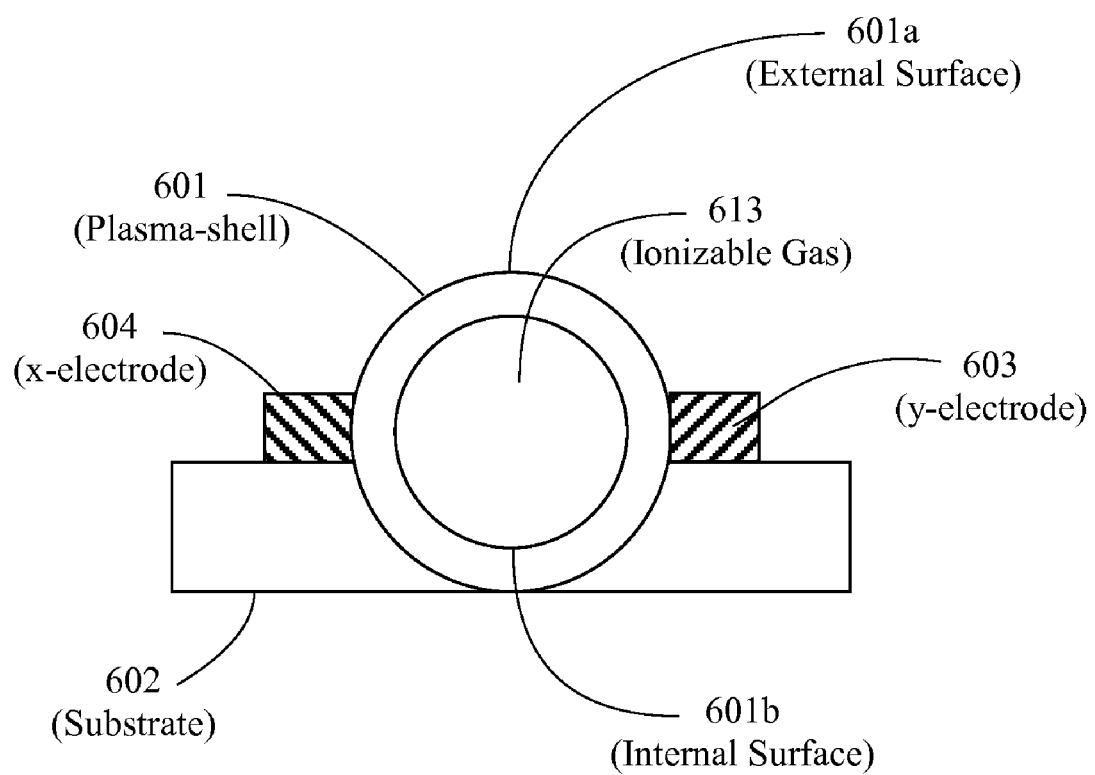
FIG. 6 shows a Plasma-shell mounted on a substrate as a PDP pixel element.

In one embodiment of this invention, the Plasma-tube is used in combination with one or more Plasma-shells. A Plasma-shell is shown as the pixel element of a single substrate PDP device in FIG. 6. In FIG. 6 the Plasma-shell 601 may be a Plasma-disc, Plasma-sphere, or Plasma-dome. For the assembly of multiple PDP cells or pixels, it is contemplated using Plasma-tubes alone or in combination with Plasma-shells. The Plasma-shell 601 has an external surface 601a and an internal surface 601b and is positioned in a well or cavity on a PDP substrate 602 and is composed of a material selected to have the properties of transmissivity to light, while being sufficiently impermeable as to the confined ionizable gas 613. The gas 613 is selected so as to discharge and produce light in the visible, IR, near UV, or UV range when a voltage is applied to electrodes 604 and 603. In the case where the discharge of the ionizable gas produces UV, a UV excitable phosphor (not shown) may be applied to the exterior or interior of the Plasma shell 601 or embedded within the shell to produce light. Besides phosphors, other coatings may be applied to the interior and exterior of the shell to enhance contrast, and/or to decrease operating voltage. One such coating contemplated in the practice of this invention is a secondary electron emitter material such as magnesium oxide. Magnesium oxide is used in a PDP to decrease operating voltages. Also light reflective material coatings may be used.

In accordance with this invention, there is provided apparatus and method comprising a very sensitive ionizing radiation sensor made from an array of Plasma-tubes. The inherent sensitivity of each Plasma-tube to ionizing radiation is multiplied by the large surface area that can be combined into a single sensor.

Figure 7:
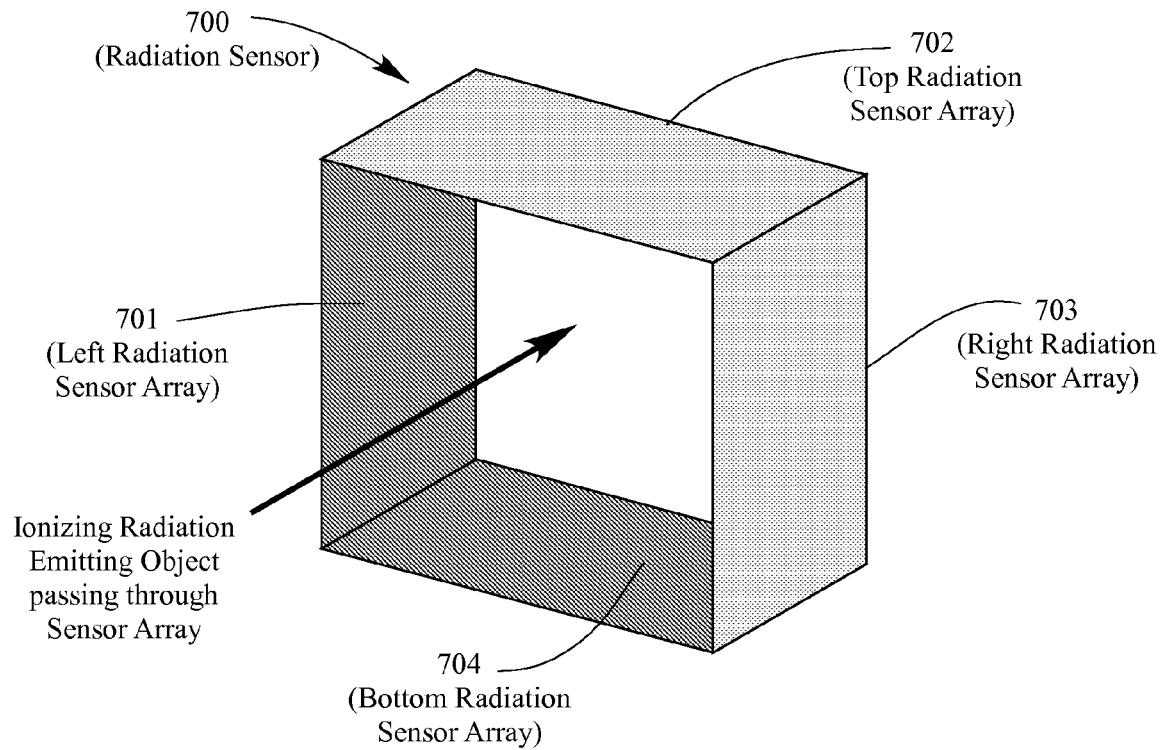
FIG. 7 is a perspective view of a rectangular ring Plasma-tube array arranged to detect ionizing radiation sources passed through it.

FIG. 7 shows a rectangular ring Plasma-tube array 700 arranged to detect ionizing radiation sources passed through it. The sensor sensitivity is augmented by the sum of the radiation detected by all four-sensor arrays 701, 702, 703, and 704. The ring may comprise a cylinder or other hollow body of any suitable geometric shape through which an object can be passed through and inspected for radiation emissions. Typical geometric shapes include a circle, square, rectangle, triangle, pentagon, or hexagon. The ring or cylinder may comprise a tunnel, channel, groove, furrow, rut, passageway, subway, hollow or excavate. Examples of objects to be inspected include not by way of limitation a container, case, freight, luggage, cargo, clothing, garment, attire, or vehicles such as motorcycles, automobiles, trucks, trains, ships, or boats.

Figure 8:
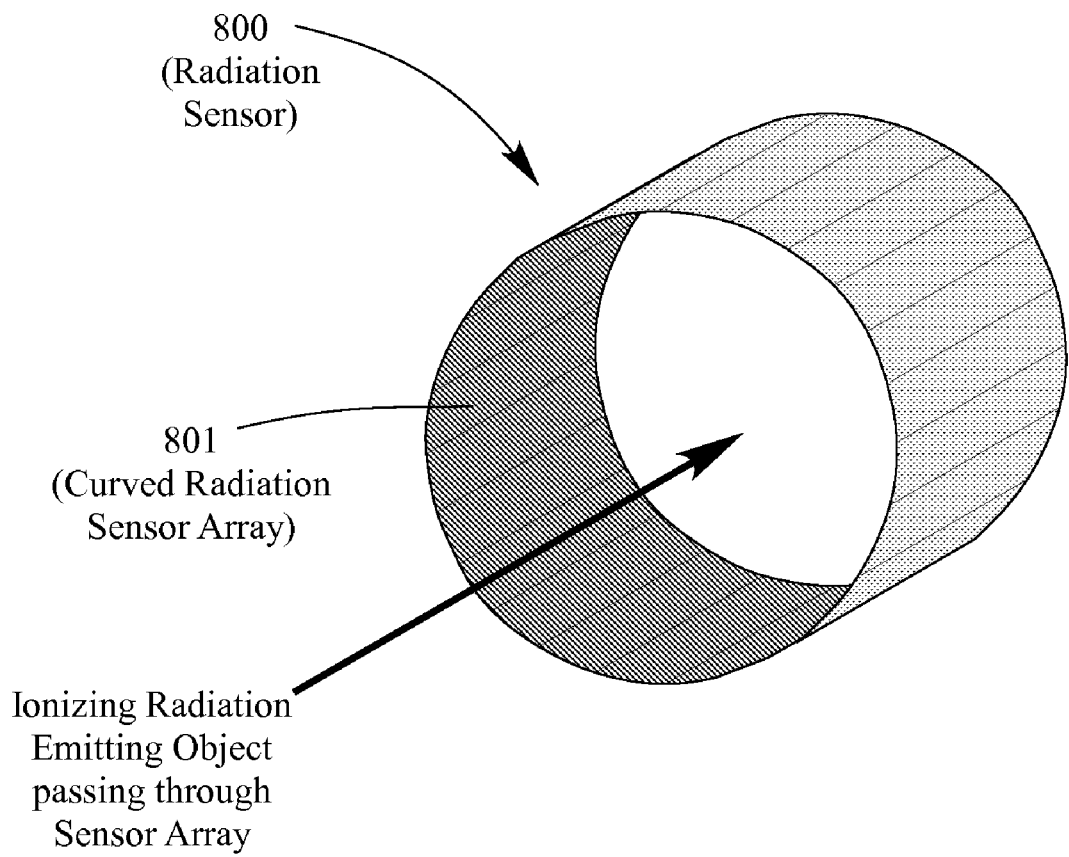
FIG. 8 is a perspective view of a cylindrical ring Plasma-tube array arranged to detect ionizing radiation sources passed through it.

FIG. 8 shows a cylindrical ring Plasma-tube array 800 arranged to detect ionizing radiation sources passed through it. The sensor sensitivity is augmented by the sum of the radiation detected by the entire area of the cylindrical arrays 801.

Figure 9:
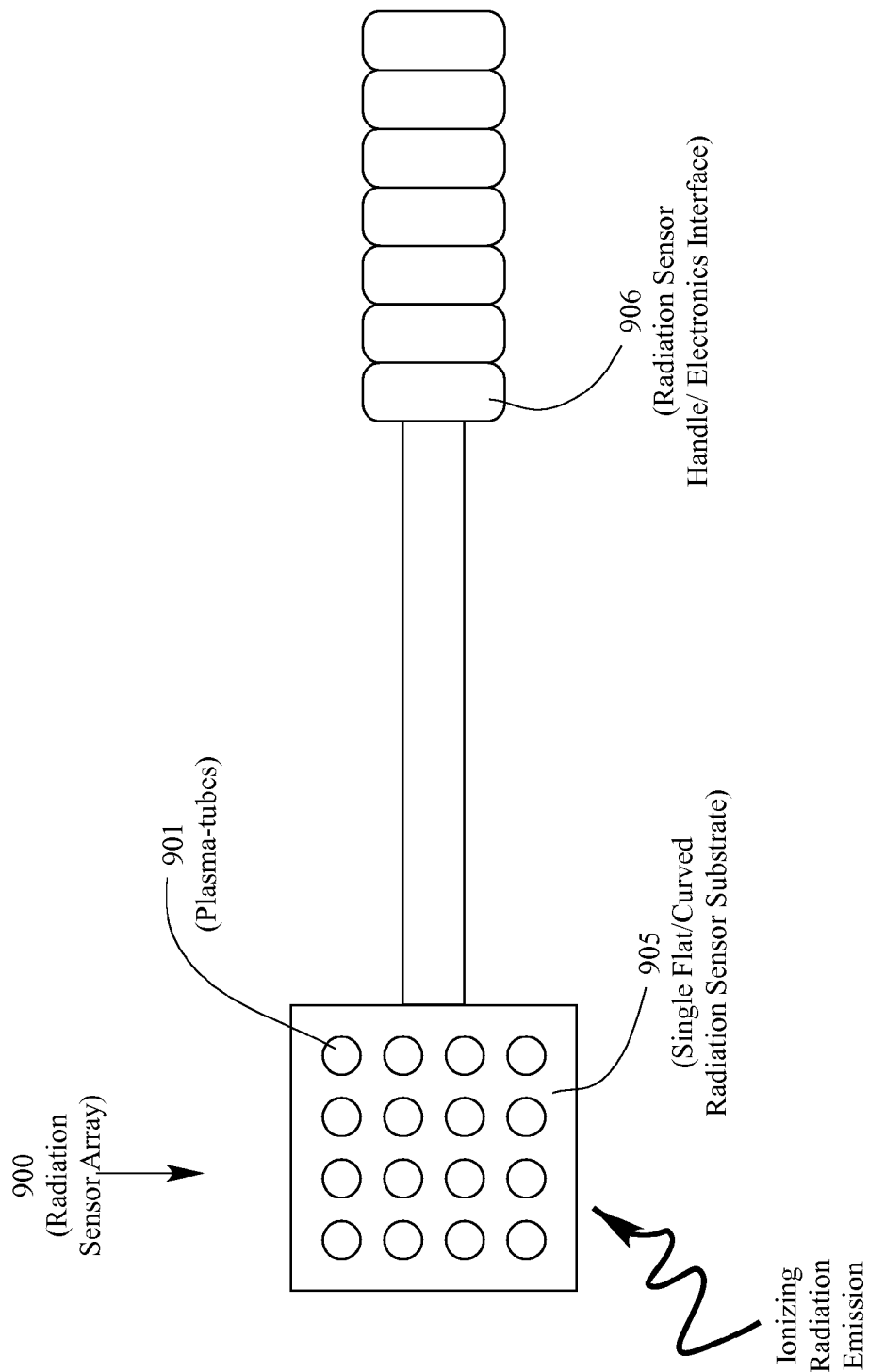
FIG. 9 shows a flat or curved panel Plasma-tube array arranged to detect ionizing radiation sources in proximity to it.

FIG. 9 shows a flat or curved panel Plasma-tube array 900 arranged to detect ionizing radiation sources in proximity to it. The paddle wand has a substrate 905 containing a large array of Plasma-tubes 901. This arrangement can be used in like or in conjunction with widely used metal detector wands. Handle 906 contains the sensor electronics interface.

Figure 10:
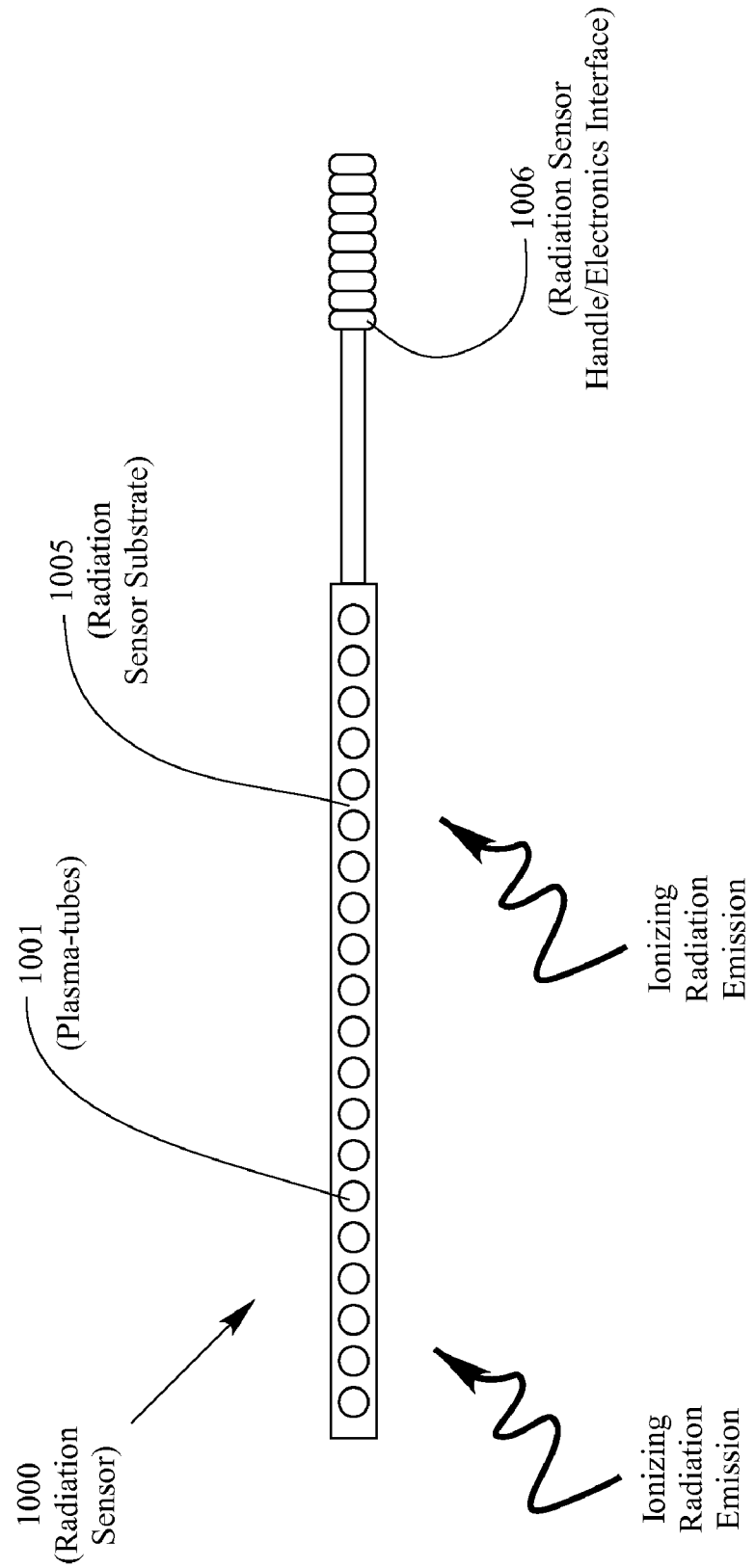
FIG. 10 shows a rod like Plasma-tube array arranged to detect ionizing radiation sources in proximity to it.

FIG. 10 shows a rod-like panel Plasma-tube array 1000 arranged to detect ionizing radiation sources in proximity to it. The rod has a substrate 1005 containing a large array of Plasma-tubes 1001. This arrangement can be used to probe deep into ship cargo holds or containers to detect radioactive material that is both buried and shielded to conceal its presence. The rod like shape of this detector together with the large number of detectors along its length enhances detection sensitivity. Further, the rod detector shape allows the detector to be brought into close proximity to a shielded radioactive source. For example a ship's cargo hold full of grain may be probed with a long rod detector. Handle 1006 contains the sensor electronics interface.

PDP Electronics

Figure 11:
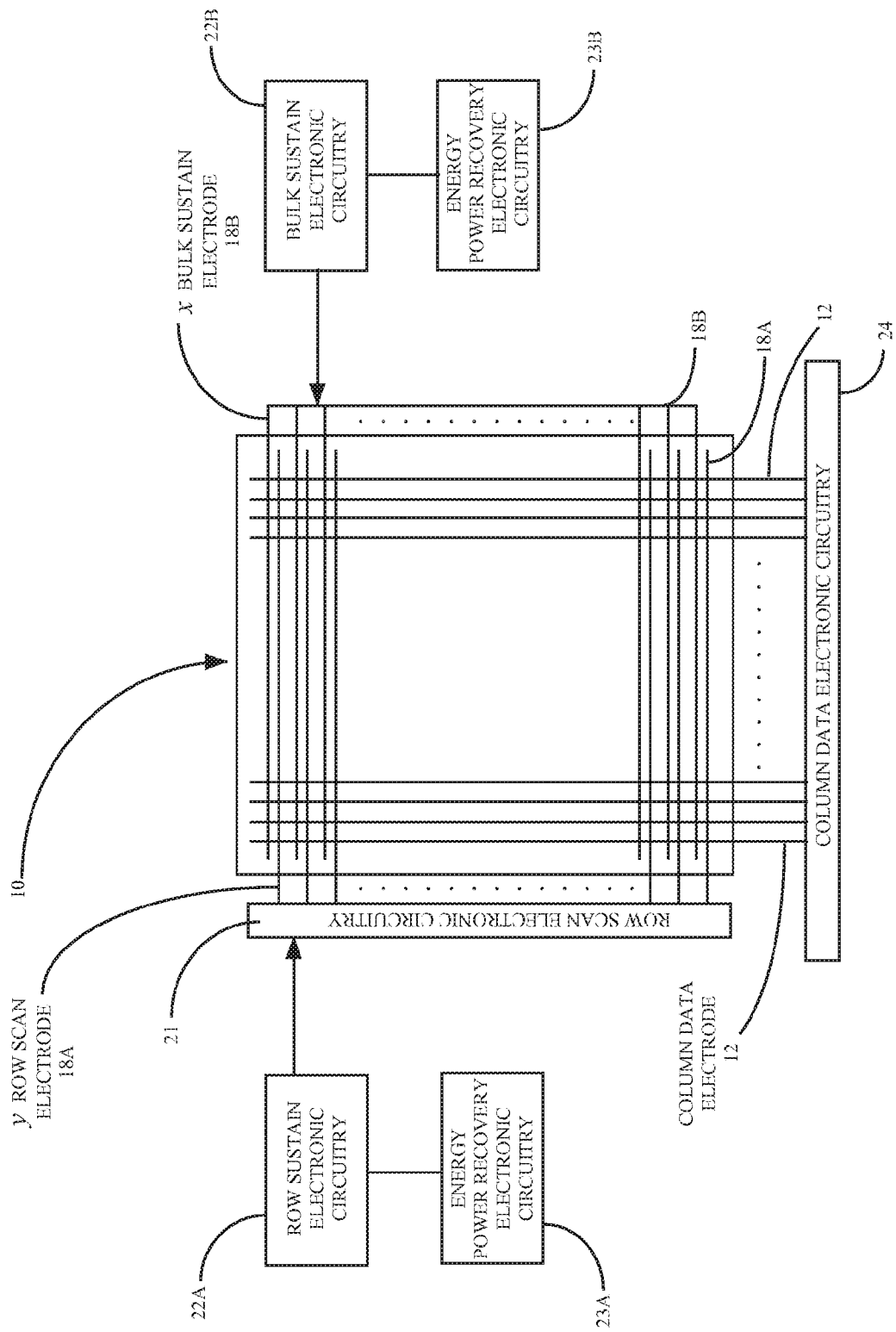
FIG. 11 shows a block diagram of electronics for driving an AC gas discharge plasma display with Plasma-tubes as pixels.

FIG. 11 is a block diagram of a plasma display panel (PDP) 10 with electronic circuitry 21 for y row scan electrodes 18A, bulk sustain electronic circuitry 22B for x bulk sustain electrode 18B and column data electronic circuitry 24 for the column data electrodes 12. The pixels or subpixels of the PDP comprise Plasma-tubes not shown in FIG. 11. There is also shown row sustain electronic circuitry 22A with an energy power recovery electronic circuit 23A. There is also shown energy power recovery electronic circuitry 23B for the bulk sustain electronic circuitry 22B. The electronics architecture used in FIG. 11 is ADS as described in the Shinoda and other patents cited herein including U.S. Pat. No. 5,661,500. In addition, other architectures as described herein and known in the prior art may be utilized. These architectures including Shinoda ADS may be used to address Plasma-tubes, alone or in combination with Plasma-shells, including Plasma-spheres, Plasma-discs, or Plasma-domes in a PDP.

ADS

A basic electronics architecture for addressing and sustaining a surface discharge AC plasma display is called Address Display Separately (ADS). The ADS architecture may be used for a monochrome or multicolor display. The ADS architecture is disclosed in a number of Fujitsu patents including U.S. Pat. Nos. 5,541,618 (Shinoda) and 5,724,054 (Shinoda), incorporated herein by reference. Also see U.S. Pat. Nos. 5,446,344 (Kanazawa), and 5,661,500 (Shinoda et al.), incorporated herein by reference. ADS has become a basic electronic architecture widely used in the AC plasma display industry for the manufacture of PDP monitors and television.

Fujitsu ADS architecture is commercially used by Fujitsu and is also widely used by competing manufacturers including Matsushita and others. ADS is disclosed in U.S. Pat. No. 5,745,086(Weber), incorporated herein by reference. See FIGS. 2, 3, 11 of Weber ('086). The ADS method of addressing and sustaining a surface discharge display as disclosed in U.S. Pat. Nos. 5,541,618 (Shinoda) and 5,724,054 (Shinoda) incorporated herein by reference, sustains the entire panel (all rows) after the addressing of the entire panel. The addressing and sustaining are done separately and are not done simultaneously. ADS may be used to address Plasma-tubes alone or in combination with Plasma-shells including Plasma-spheres, Plasma-discs, or Plasma-domes in a PDP.

ALIS

This invention may also use the so-called shared electrode or electronic ALIS drive system disclosed by Fujitsu in U.S. Pat. Nos. 6,489,939 (Asso et al.), 6,498,593 (Fujimoto et al.), 6,531,819 (Nakahara et al.), 6,559,814 (Kanazawa et al.), 6,577,062 (Itokawa et al.), 6,603,446 (Kanazawa et al.), 6,630,790 (Kanazawa et al.), 6,636,188 (Kanazawa et al.), 6,667,579 (Kanazawa et al.), 6,667,728 (Kanazawa et al.), 6,703,792 (Kawada et al.), and U.S. Patent Application Publication 2004/0046509 (Sakita), all of which are incorporated herein by reference. In accordance with this invention, ALIS may be used to address Plasma-tubes alone or in combination with Plasma-shells, including Plasma-spheres, Plasma-discs, and Plasma-domes.

AWD

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. Nos. 3,801,861 (Petty et al.) and 3,803,449 (Schmersal), both incorporated herein by reference. FIGS. 1 and 3 of the Shinoda ('054) ADS patent disclose AWD architecture as prior art. The AWD electronics architecture for addressing and sustaining monochrome PDP has also been adopted for addressing and sustaining multicolor PDP. For example, Samsung Display Devices Co., Ltd., has disclosed AWD and the superimpose of address pulses with the sustain pulse. Samsung specifically labels this as Address While Display (AWD). "See High-Luminance and High-Contrast HDTV PDP with Overlapping Driving Scheme", J. Ryeom et al., pages 743 to 746, *Proceedings of the Sixth International Display Workshops*, IDW 99, Dec. 1-3, 1999, Sendai, Japan and AWD as disclosed in U.S. Pat. No. 6,208,081 (Eo et al.), incorporated herein by reference. LG Electronics Inc. has disclosed a variation of AWD with a Multiple Addressing in a Single Sustain (MASS) in U.S. Pat. No. 6,198,476 (Hong et al.), incorporated herein by reference. Also see U.S. Pat. No. 5,914,563 (Lee et al.), incorporated herein by reference. AWD may be used to address Plasma-tubes alone or in combination with Plasma-shells, including Plasma-spheres, Plasma-discs, and Plasma-domes.

An AC voltage refresh technique or architecture is disclosed by U.S. Pat. No. 3,958,151 (Yano et al.), incorporated herein by reference. In one embodiment of this invention the Plasma-tubes alone or in combination with Plasma-shells are filled with pure neon and operated with the architecture of Yano ('151).

Energy Recovery

Energy recovery is used for the efficient operation of a PDP. Examples of energy recovery architecture and circuits are well known in the prior art. These include U.S. Pat. Nos. 4,772,884 (Weber et al.), 4,866,349 (Weber et al.), 5,081,400 (Weber et al.), 5,438,290 (Tanaka), 5,642,018 (Marcotte), 5,670,974 (Ohba et al.), 5,808,420 (Rilly et al.), and 5,828,353 (Kishi et al.), all incorporated herein by reference.

Ramp Waveforms

Ramp or slope waveforms may be used in the practice of this invention. The prior art discloses both fast and slow rise slopes and ramps for the addressing of AC plasma displays. The early patents disclosing fast and slow rise ramps or slopes include U.S. Pat. Nos. 4,063,131 (Miller), 4,087,805 (Miller) 4,087,807 (Miavecz), 4,611,203 (Criscimagna et al.), and 4,683,470 (Criscimagna et al.), all incorporated herein by reference.

Architecture for a ramp waveform address is disclosed in U.S. Pat. No. 5,745,086 (Weber), incorporated herein by reference. Weber ('086) discloses positive or negative ramp voltages that exhibit a slope that is set to assure that current flow through each display pixel site remains in a positive resistance region of the gas discharge. The ramp architecture may be used in combination with ADS as disclosed in FIG. 11 of Weber ('086). PCT Patent Application Publication WO 00/30065, and U.S. Pat. Nos. 6,738,033 (Hibino et al.) and 6,900,598 (Hibino et al.) also disclose architecture for a ramp reset voltage and are incorporated herein by reference.

Artifact Reduction

Artifact reduction techniques may be used in the practice of this invention. The PDP industry has used various techniques to reduce motion and visual artifacts in a PDP display. Pioneer of Tokyo, Japan has disclosed a technique called CLEAR for the reduction of false contour and related problems. See Tokunaga et al. "Development of New Driving Method for AC-PDPs", *Proceedings of the Sixth International Display Workshops, IDW* 99, Sendai, Japan (Dec. 1-3, 1999): 787-790. Also see European Patent Application Publications EP 1 020 838 A1 (Tokunaga et al.). The CLEAR techniques disclosed in the above Pioneer IDW publication and Pioneer EP 1020838 A1, are incorporated herein by reference.

SAS

In one embodiment of this invention it is contemplated using SAS electronic architecture to address a PDP panel constructed of Plasma-tubes alone or in combination with Plasma-shells, including Plasma-spheres, Plasma-discs, and/or Plasma-domes. SAS architecture comprises addressing one display section of a surface discharge PDP while another section of the PDP is being simultaneously sustained. This architecture is called Simultaneous Address and Sustain (SAS). See U.S. Pat. No. 6,985,125, incorporated herein by reference. SAS offers a unique electronic architecture, which is different from prior art columnar discharge and surface discharge electronics architectures including ADS, AWD, and MASS. It offers important advantages as discussed herein. In accordance with the practice of SAS with a surface discharge PDP, addressing voltage waveforms are applied to a surface discharge PDP having an array of data electrodes on a bottom or rear substrate and an array of at least two electrodes on a top or front viewing substrate, one top electrode being a bulk sustain electrode x and the other top electrode being a row scan electrode y. The row scan electrode y may also be called a row sustain electrode because it performs the dual functions of both addressing and sustaining. An important feature and advantage of SAS is that it allows selectively addressing of one section of a surface discharge PDP with selective write and/or selective erase voltages while another section of the panel is being simultaneously sustained. A section is defined as a predetermined number of bulk sustain electrodes x and row scan electrodes y. In a surface discharge PDP, a single row is comprised of one pair of parallel top electrodes x and y. In one embodiment of SAS, there is provided the simultaneous addressing and sustaining of at least two sections $S_1$ and $S_2$ of a surface discharge PDP having a row scan, bulk sustain, and data electrodes, which comprises addressing one section $S_1$ of the PDP while a sustaining voltage is being simultaneously applied to at least one other section $S_2$ of the PDP. In another embodiment, the simultaneous addressing and sustaining is interlaced whereby one pair of electrodes y and x are addressed without being sustained and an adjacent pair of electrodes y and x are simultaneously sustained without being addressed. This interlacing can be repeated throughout the display. In this embodiment, a section S is defined as one or more pairs of interlaced y and x-electrodes. In the practice of SAS, the row scan and bulk sustain electrodes of one section that is being sustained may have a reference voltage which is offset from the voltages applied to the data electrodes for the addressing of another section such that the addressing does not electrically interact with the row scan and bulk sustain electrodes of the section which is being sustained. In a plasma display in which gray scale is realized through time multiplexing, a frame or a field of picture data is divided into subfields. Each subfield is typically composed of a reset period, an addressing period, and a number of sustains. The number of sustains in a subfield corresponds to a specific gray scale weight. Pixels that are selected to be "on" in a given subfield will be illuminated proportionally to the number of sustains in the subfield. In the course of one frame, pixels may be selected to be "on" or "off" for the various subfields. A gray scale image is realized by integrating in time the various "on" and "off" pixels of each of the subfields. Addressing is the selective application of data to individual pixels. It includes the writing or erasing of individual pixels. Reset is a voltage pulse, which forms wall charges to enhance the addressing of a pixel. It can be of various waveform shapes and voltage amplitudes including fast or slow rise time voltage ramps and exponential voltage pulses. A reset is typically used at the start of a frame before the addressing of a section. A reset may also be used before the addressing period of a subsequent subfield. In accordance with another embodiment of the SAS architecture, there is applied a slow rise time or slow ramp reset voltage as disclosed in U.S. Pat. No. 5,745,086 (Weber) cited above and incorporated herein by reference. As used herein slow rise time or slow ramp voltage is a bulk address commonly called a reset pulse with a positive or negative slope so as to provide a uniform wall charge at all pixels in the PDP. The slower the rise time of the reset ramp, the less visible the light or background glow from those off-pixels (not in the on-state) during the slow ramp bulk address. Less background glow is particularly desirable for increasing the contrast ratio, which is inversely proportional to the light-output from the off-pixels during the reset pulse. Those off-pixels, which are not in the on-state, will give a background glow during the reset. The slower the ramp, the less light output with a resulting higher contrast ratio. Typically the slow ramp reset voltages disclosed in the prior art have a slope of about 3.5 volts per microsecond with a range of about 2 to about 9 volts per microsecond. In the SAS architecture, it is possible to use slow ramp reset voltages below 2 volts per microsecond, for example about 1 to 1.5 volts per microsecond without decreasing the number of PDP rows, without decreasing the number of sustain pulses or without decreasing the number of subfields.

Positive Column Gas Discharge

In one embodiment of this invention, it is contemplated that the PDP with Plasma-discs may be operated with positive column gas discharge. The use of Plasma-discs allows the PDP to be operated with positive column gas discharge, for example as disclosed by Weber, Rutherford, and other prior art cited hereinafter and incorporated herein by reference. The discharge length inside the Plasma-disc must be sufficient to accommodate the length of the positive column gas discharge.

U.S. Pat. No. 6,184,848 (Weber) discloses the generation of a positive column plasma discharge wherein the plasma discharge evidences a balance of positively charged ions and electrons. The PDP discharge operates using the same fundamental principle as a fluorescent lamp, i.e., a PDP employs ultraviolet light generated by a gas discharge to excite visible light-emitting phosphors. Weber discloses an inactive isolation bar.

Rutherford, James. "PDP With Improved Drive Performance at Reduced Cost." *Proceedings of the Ninth International Display Workshops*, Hiroshima, Japan (Dec. 4-6, 2002): 837-840 discloses an electrode structure and electronics for a "positive column" plasma display. Rutherford discloses the use of the isolation bar as an active electrode.

Additional positive column gas discharge prior art incorporated herein by reference include:

Weber, Larry F. "Positive Column AC Plasma Display." 23$^{rd}$ International Display Research Conference Proceedings, Phoenix, Ariz. IDRC 03, (Sep. 16-18, 2003): 119-124

Nagorny et al. "Dielectric Properties and Efficiency of Positive Column AC PDP."23$^{rd}$ *International Display Research Conference*, IDRC 03, Phoenix, Ariz. (Sep. 16-18, 2003) P-45: 300-303

Drallos et al. "Simulations of AC PDP Positive Column and Cathode Fall Efficiencies." 23$^{rd}$ *International Display Research Conference Proceedings*, IDRC 03, Phoenix, Ariz. (Sep. 16-18, 2003) P-48: 304-306

U.S. Pat. No. 6,376,995 (Kato et al.)

U.S. Pat. No. 6,528,952 (Kato et al.)

U.S. Pat. No. 6,693,389 (Marcotte et al.)

U.S. Pat. No. 6,768,478 (Wani et al.)

U.S. Patent Application Publication 2003/0102812 (Marcotte et al.)

Radio Frequency

The Plasma-tubes used in the detection may be operated with radio frequency (RF). The RF may especially be used to sustain the plasma discharge. RF may also be used to operate the Plasma-tubes with a positive column discharge. The use of RF in a PDP is disclosed in U.S. Pat. Nos. 6,271,810 (Yoo et al.), 6,340,866 (Yoo), 6,473,061 (Lim et al.), 6,476,562 (Yoo et al.), 6,483,489 (Yoo et al.), 6,501,447 (Kang et al.), 6,605,897 (Yoo), 6,624,799 (Kang et al.), 6,661,394 (Choi), and 6,794,820 (Kang et al.), all incorporated herein by reference.

Shell Materials

The Plasma-tube may be constructed of any suitable material such as glass or plastic as disclosed in the prior art. In the practice of this invention, it is contemplated that the Plasma-tube may be made of any suitable inorganic compounds of metals and/or metalloids, including mixtures or combinations thereof. Contemplated inorganic compounds include the oxides, carbides, nitrides, nitrates, silicates, aluminates, sulfates, sulfides, phosphates, borates, and/or borides. The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth. Inorganic materials suitable for use are magnesium oxide(s), aluminum oxide(s), zirconium oxide(s), and silicon carbide(s) such as MgO, $Al_2O_3$, $ZrO_2$, $SiO_2$, and/or SiC. In one embodiment of this invention, the Plasma-tube is made of fused particles of glass, ceramic, glass ceramic, refractory, fused silica, quartz, or like amorphous and/or crystalline materials including mixtures of such. In one preferred embodiment, a ceramic material is selected based on its transmissivity to light after firing. This may include selecting ceramics material with various optical cutoff frequencies to produce various colors. One preferred material contemplated for this application is aluminum oxide. Aluminum oxide is transmissive from the UV range to the IR range. Because it is transmissive in the UV range, phosphors excited by UV may be applied to the exterior of the Plasma-tube to produce various colors. The application of the phosphor to the exterior of the Plasma-tube may be done by any suitable means before or after the Plasma-tube is positioned in the PDP, i.e., on a flexible or rigid substrate. There may be applied several layers or coatings of phosphors, each of a different composition. In one specific embodiment of this invention, the Plasma-tube is made of an aluminate silicate or contains a layer of aluminate silicate. When the ionizable gas mixture contains helium, the aluminate silicate is especially beneficial in preventing the escaping of helium. It is also contemplated that the Plasma-tube may be made of lead silicates, lead phosphates, lead oxides, borosilicates, alkali silicates, aluminum oxides, and pure vitreous silica. For secondary electron emission, the Plasma-tube may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, aluminates, phosphates, borates and other inorganic compounds of the above and other elements. The Plasma-tube may also contain or be partially or wholly constructed of luminescent materials such as inorganic phosphor(s). The phosphor may be a continuous or discontinuous layer or coating on the interior or exterior of the shell. Phosphor particles may also be introduced inside the Plasma-tube or embedded within the shell. Luminescent quantum dots may also be incorporated into the shell.

Secondary Electron Emission

The use of secondary electron emission (Townsend coefficient) materials in a plasma display is well known in the prior art and is disclosed in U.S. Pat. No. 3,716,742 (Nakayama et al.). The use of Group IIA compounds including magnesium oxide is disclosed in U.S. Pat. Nos. 3,836,393 and 3,846,171. The use of rare earth compounds in an AC plasma display is disclosed in U.S. Pat. Nos. 4,126,807, 4,126,809, and 4,494,038, all issued to Wedding et al., and incorporated herein by reference. Lead oxide may also be used as a secondary electron material. Mixtures of secondary electron emission materials may be used. In one embodiment and mode contemplated for the practice of this invention, the secondary electron emission material is magnesium oxide on part or all of the internal surface of a Plasma-tube. The secondary electron emission material may also be on the external surface. The thickness of the magnesium oxide may range from about 250 Angstrom Units to about 10,000 Angstrom Units (Å). The entire Plasma-tube may be made of a secondary electronic material such as magnesium oxide. A secondary electron material may also be dispersed or suspended as particles within the ionizable gas such as with a fluidized bed. Phosphor particles may also be dispersed or suspended in the gas such as with a fluidized bed, and may also be added to the inner or external surface of the Plasma-tube. Magnesium oxide increases the ionization level through secondary electron emission that in turn leads to reduced gas discharge voltages. In one embodiment, the magnesium oxide is on the inner surface of the Plasma-tube and the phosphor is located on external surface of the Plasma-tube. Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a Plasma-tube minimizes exposure of the magnesium oxide to contamination. The magnesium oxide may be applied to the inside of the Plasma-tube by incorporating magnesium vapor as part of the ionizable gases introduced into the Plasma-tube. The magnesium may be oxidized while at an elevated temperature. In some embodiments, the magnesium oxide may be added as particles to the gas. Other secondary electron materials may be used in place of or in combination with magnesium oxide. In one embodiment hereof, the secondary electron material such as magnesium oxide or any other selected material such as magnesium to be oxidized in situ is introduced into the gas by means of a fluidized bed. Other materials such as phosphor particles or vapor may also be introduced into the gas with a fluid bed or other means.

Ionizable Gas

The hollow Plasma-tubes used in the practice of this invention contain one or more ionizable gas components. In the practice of this invention, the gas is selected to emit photons in the visible, IR, and/or UV spectrum. The UV spectrum is divided into regions. The near UV region is a spectrum ranging from about 340 to 450 nm (nanometers). The mid or deep UV region is a spectrum ranging from about 225 to 340 nm. The vacuum UV region is a spectrum ranging from about 100 to 225 nm. The PDP prior art has used vacuum UV to excite photoluminescent phosphors. In the practice of this invention, it is contemplated using a gas, which provides UV over the entire spectrum ranging from about 100 to about 450 nm. The PDP operates with greater efficiency at the higher range of the UV spectrum, such as in the mid UV and/or near UV spectrum. In one preferred embodiment, there is selected a gas which emits gas discharge photons in the near UV range. In another embodiment, there is selected a gas which emits gas discharge photons in the mid UV range. In one embodiment, the selected gas emits photons from the upper part of the mid UV range through the near UV range, about 275 nm to 450 nm. As used herein, ionizable gas or gas means one or more gas components. In the practice of this invention, the gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof. Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$). In one embodiment, a two-component gas mixture (or composition) is used such as a mixture of argon and xenon, argon and helium, xenon and helium, neon and argon, neon and xenon, neon and helium, and neon and krypton. Specific two-component gas mixtures (compositions) include about 5 to 90% atoms of argon with the balance xenon. Another two-component gas mixture is a mother gas of neon containing 0.05 to 15% atoms of xenon, argon, or krypton. This can also be a three-component, four-component gas, or five-component gas by using small quantities of an additional gas or gases selected from xenon, argon, krypton, and/or helium. In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon. U.S. Pat. No. 4,081,712 (Bode et al.), incorporated by reference, discloses the addition of helium to a gaseous medium of 90% to 99.99% atoms of neon and 10 to 0.01% atoms of argon, xenon, and/or krypton. In one embodiment there is used a high concentration of helium with the balance selected from one or more gases of neon, argon, xenon, and nitrogen as disclosed in U.S. Pat. No. 6,285,129 (Park) and incorporated herein by reference. A high concentration of xenon may also be used with one or more other gases as disclosed in U.S. Pat. No. 5,770,921 (Aoki et al.), incorporated herein by reference. Pure neon may be used and the Plasma-tubes operated without memory margin using the architecture disclosed by U.S. Pat. No. 3,958,151 (Yano) discussed above and incorporated by reference.

Excimers

Excimer gases may also be used as disclosed in U.S. Pat. Nos. 4,549,109 (Nighan et al.) and 4,703,229 (Nighan et al.), both incorporated herein by reference. Nighan et al. ('109) and ('229) disclose the use of excimer gases formed by the combination of halogens with rare gases. The halogens include fluorine, chlorine, bromine, and iodine. The rare gases include helium, xenon, argon, neon, krypton, and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses a PDP using excimer gases comprised of rare gases and halogens.

Other Gases

Depending upon the application, a wide variety of gases are contemplated for the practice of this invention. Such other applications include gas-sensing devices for detecting radiation and radar transmissions. Such other gases include $C_2H_2$—$CF_4$—Ar mixtures as disclosed in U.S. Pat. Nos. 4,201,692 (Christophorou et al.) and 4,309,307 (Christophorou et al.), both incorporated herein by reference. Also contemplated are gases disclosed in U.S. Pat. No. 4,553,062 (Ballon et al.), incorporated by reference. Other gases include sulfur hexafluoride, HF, $H_2S$, $SO_2$, SO, $H_2O_2$, and so forth.

Gas Pressure

This invention allows the construction and operation of a gas discharge (plasma) display with gas pressures at or above 1 atmosphere. In the prior art, gas discharge (plasma) displays are operated with the ionizable gas at a pressure below atmospheric. Gas pressures above atmospheric are not used in the prior art because of structural problems. Higher gas pressures above atmospheric may cause the display substrates to separate, especially at elevations of 4000 feet or more above sea level. Such separation may also occur between the substrate and a viewing envelope or dome in a single substrate or monolithic plasma panel structure. In the practice of this invention, the gas pressure inside of the hollow Plasma-tube may be equal to or less than atmospheric pressure or may be equal to or greater than atmospheric pressure. The typical sub-atmospheric pressure is about 150 to 760 Torr. However, pressures above atmospheric may be used depending upon the structural integrity of the Plasma-tube. In one embodiment of this invention, the gas pressure inside of the Plasma-tube is equal to or less than atmospheric, about 150 to 760 Torr, typically about 350 to about 650 Torr. In another embodiment of this invention, the gas pressure inside of the Plasma-tube is equal to or greater than atmospheric. Depending upon the structural strength of the Plasma-tube, the pressure above atmospheric may be about 1 to 250 atmospheres (760 to 190,000 Torr) or greater. Higher gas pressures increase the luminous efficiency of the plasma display.

Gas Processing

This invention avoids the costly prior art gas filling techniques used in the manufacture of gas discharge (plasma) display devices. The prior art introduces gas through one or more apertures into the device requiring a gas injection hole and tube. The prior art manufacture steps typically include heating and baking out the assembled device (before gas fill) at a high-elevated temperature under vacuum for 2 to 12 hours. The vacuum is obtained via external suction through a tube inserted in an aperture. The bake out is followed by back fill of the entire panel with an ionizable gas introduced through the tube and aperture. The tube is then sealed-off. This bake out and gas fill process is a major production bottleneck and yield loss in the manufacture of gas discharge (plasma) display devices, requiring substantial capital equipment and a large amount of process time. For color AC plasma display panels of 40 to 50 inches in diameter, the bake out and vacuum cycle may be 10 to 30 hours per panel or 10 to 30 million hours per year for a manufacture facility producing over 1 million plasma display panels per year. The gas-filled Plasma-tubes used in this invention can be produced in large economical volumes and added to the gas discharge (plasma) display device without the necessity of costly bake out and gas process capital equipment. The savings in capital equipment cost and operations costs are substantial. Also the entire PDP does not have to be gas processed with potential yield loss at the end of the PDP manufacture.

PDP Structure

In one embodiment, the Plasma-tubes are located on or in a single substrate or monolithic PDP structure. Single substrate PDP structures are disclosed in U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all cited above and incorporated herein by reference. The Plasma-tubes may be positioned on the surface of the substrate and/or positioned in the substrate such as in channels, trenches, grooves, wells, cavities, hollows, and so forth. These channels, trenches, grooves, wells, cavities, hollows, etc., may extend through the substrate so that the Plasma-tubes positioned therein may be viewed from either side of the substrate. The Plasma-tubes may also be positioned on or in a substrate within a dual substrate plasma display structure. Each tube is placed inside of a gas discharge (plasma) display device, for example, on the substrate along the channels, trenches or grooves between the barrier walls of a plasma display barrier structure such as disclosed in U.S. Pat. Nos. 5,661,500 (Shinoda et al.), 5,674,553 (Shinoda et al.), and 5,793,158 (Wedding), cited above and incorporated herein by reference. The Plasma-tubes may also be positioned within a cavity, well, hollow, concavity, or saddle of a plasma display substrate, for example as disclosed by U.S. Pat. No. 4,827,186 (Knauer et al.), incorporated herein by reference. In a device as disclosed by Wedding ('158) or Shinoda et al. ('500), the Plasma-tubes may be conveniently added to the substrate cavities and the space between opposing electrodes before the device is sealed. An aperture and tube can be used for bake out if needed of the space between the two opposing substrates, but the costly gas fill operation is eliminated. AC plasma displays of 40 inches or larger are fragile with the risk of breakage during shipment and handling. The presence of the Plasma-tubes inside of the display device adds structural support and integrity to the device. The Plasma-tubes may be sprayed, stamped, pressed, poured, screen-printed, or otherwise applied to the substrate. The substrate surface may contain an adhesive or sticky surface to bind the Plasma-tube to the substrate. The practice of this invention is not limited to a flat surface display. The Plasma-tube may be positioned or located on a conformal surface or substrate so as to conform to a predetermined shape such as a curved or irregular surface. In one embodiment of this invention, each Plasma-tube is positioned within a cavity on a single-substrate or monolithic gas discharge structure that has a flexible or bendable substrate. In another embodiment, the substrate is rigid. The substrate may also be partially or semi flexible.

Substrate

In accordance with various embodiments of this invention, the PDP may be comprised of a single substrate or dual substrate device with flexible, semi-flexible, or rigid substrates. The substrate may be opaque, transparent, translucent, or non-light transmitting. In some embodiments, there may be used multiple substrates of three or more. Substrates may be flexible films, such as a polymeric film substrate. The flexible substrate may also be made of metallic materials alone or incorporated into a polymeric substrate. Alternatively or in addition, one or both substrates may be made of an optically transparent thermoplastic polymeric material. Examples of suitable such materials are polycarbonate, polyvinyl chloride, polystyrene, polymethyl methacrylate, polyurethane polyimide, polyester, and cyclic polyolefin polymers. More broadly, the substrates may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference. Alternatively, one or both of the substrates may be made of a rigid material. For example, one or both of the substrates may be a glass substrate. The glass may be a conventionally available glass, for example having a thickness of approximately 0.2 mm-1 mm. Alternatively, other suitable transparent materials may be used, such as a rigid plastic or a plastic film. The plastic film may have a high glass transition temperature, for example above 65° C., and may have a transparency greater than 85% at 530 nm. Further details regarding substrates and substrate materials may be found in International Publication Nos. WO 00/46854, WO 00/49421, WO 00/49658, WO 00/55915, and WO 00/55916, the entire disclosures of which are herein incorporated by reference. Apparatus, methods, and compositions for producing flexible substrates are disclosed in U.S. Pat. Nos. 5,469,020 (Herrick), 6,274,508 (Jacobsen et al.), 6,281,038 (Jacobsen et al.), 6,316,278 (Jacobsen et al.), 6,468,638 (Jacobsen et al.), 6,555,408 (Jacobsen et al.), 6,590,346 (Hadley et al.), 6,606,247 (Credelle et al.), 6,665,044 (Jacobsen et al.), and 6,683,663 (Hadley et al.), all of which are incorporated herein by reference.

Positioning of Plasma-Tube on Substrate

The Plasma-tube may be positioned or located on the substrate by any appropriate means. In one embodiment of this invention, the Plasma-tube is bonded to the surface of a monolithic or dual-substrate display such as a PDP. The Plasma-tube is bonded to the substrate surface with a non-conductive, adhesive material, which also serves as an insulating barrier to prevent electrically shorting of the conductors or electrodes connected to the Plasma-tube. The Plasma-tube may be mounted or positioned within a substrate well, cavity, hollow, or like depression. The well, cavity, hollow or depression is of suitable dimensions with a mean or average diameter, depth, and length for receiving and retaining the Plasma-tube. As used herein well includes cavity, hollow, depression, hole, or any similar configuration. In U.S. Pat. No. 4,827,186 (Knauer et al.), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate. The electrodes must be in direct contact with each Plasma-tube. An air gap between an electrode and the Plasma-tube will cause high operating voltages. A material such as conductive adhesive, and/or conductive filler may be used to bridge or connect the electrode to the Plasma-tube. Such conductive material must be carefully applied so as to not electrically short the electrode to other nearby electrodes. A dielectric material may also be applied to fill any air gap. This also may be an adhesive, etc.

Insulating Barrier

The insulating barrier may comprise any suitable non-conductive material, which bonds the Plasma-tube to the substrate. In one embodiment, there is used an epoxy resin that is the reaction product of epichlorohydrin and bisphenol-A. One such epoxy resin is a liquid epoxy resin, D.E.R. 383, produced by the Dow Plastics group of the Dow Chemical Company.

Light Barriers

Light barriers of opaque, translucent, or non-transparent material may be located between Plasma-tubes to prevent optical cross-talk between Plasma-tubes, particularly between adjacent Plasma-tubes. A black material such as carbon filler is typically used.

Electrically Conductive Bonding Substance

In the practice of this invention, the conductors or electrodes are electrically connected to each Plasma-tube with an electrically conductive bonding substance. The electrically conductive bonding substance can be any suitable inorganic or organic material including compounds, mixtures, dispersions, pastes, liquids, cements, and adhesives. In one embodiment, the electrically conductive bonding substance is an organic substance with conductive filler material. Contemplated organic substances include adhesive monomers, dimers, trimers, polymers and copolymers of materials such as polyurethanes, polysulfides, silicones, and epoxies. A wide range of other organic or polymeric materials may be used. Contemplated conductive filler materials include conductive metals or metalloids such as silver, gold, platinum, copper, chromium, nickel, aluminum, and carbon. The conductive filler may be of any suitable size and form such as particles, powder, agglomerates, or flakes of any suitable size and shape. It is contemplated that the particles, powder, agglomerates, or flakes may comprise a non-metal, metal or metalloid core with an outer layer, coating, or film of conductive metal. Some specific embodiments of conductive filler materials include silver-plated copper beads, silver-plated glass beads, silver particles, silver flakes, gold-plated copper beads, gold-plated glass beads, gold particles, gold flakes, and so forth. In one particular embodiment of this invention there is used an epoxy filled with 60 to 80% by weight silver. Examples of electrically conductive bonding substances are well known in the art. The disclosures including the compositions of the following references are incorporated herein by reference. U.S. Pat. No. 3,412,043 (Gilliland) discloses an electrically conductive composition of silver flakes and resinous binder. U.S. Pat. No. 3,983,075 (Marshall et al.) discloses a copper filled electrically conductive epoxy. U.S. Pat. No. 4,247,594 (Shea et al.) discloses an electrically conductive resinous composition of copper flakes in a resinous binder. U.S. Pat. Nos. 4,552,607 (Frey) and 4,670,339 (Frey) disclose a method of forming an electrically conductive bond using copper microspheres in an epoxy. U.S. Pat. No. 4,880,570 (Sanborn et al.) discloses an electrically conductive epoxy-based adhesive selected from the amine curing modified epoxy family with a filler of silver flakes. U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids plated with silver. Other noble metals and non-noble metals such as nickel are disclosed. U.S. Pat. No. 5,298,194 (Carter et al.) discloses an electrically conductive adhesive composition comprising a polymer or copolymer of polyolefins or polyesters filled with silver particles. U.S. Pat. No. 5, 575,956 (Hermansen et al.) discloses electrically-conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed. U.S. Pat. No. 5,891,367 (Basheer et al.) discloses a conductive epoxy adhesive comprising an epoxy resin cured or reacted with selected primary amines and filled with silver flakes. The primary amines provide improved impact resistance. U.S. Pat. No. 5,918,364 (Kulesza et al.) discloses substrate bumps or pads formed of electrically conductive polymers filled with gold or silver. U.S. Pat. No. 6,184,280 (Shibuta) discloses an organic polymer containing hollow carbon microfibers and an electrically conductive metal oxide powder. In another embodiment, the electrically conductive bonding substance is an organic substance without a conductive filler material. Examples of electrically conductive bonding substances are well known in the art. The disclosures including the compositions of the following references are incorporated herein by reference. U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers, used to form these polymers. Electrically conductive polymer compositions are also disclosed in U.S. Pat. Nos. 5,917,693 (Kono et al.), 6,096,825 (Garnier), and 6,358,438 (Isozaki et al.). The electrically conductive polymers disclosed above may also be used with conductive fillers. In some embodiments, organic ionic materials such as calcium stearate may be added to increase electrical conductivity. See U.S. Pat. No. 6,599,446 (Todt et al.), incorporated by reference. In one embodiment hereof, the electrically conductive bonding substance is luminescent, for example as disclosed in U.S. Pat. No. 6,558,576 (Brielmann et al.), incorporated herein by reference.

EMI/RFI Shielding

In some embodiments, electroconductive bonding substances may be used for EMI (electromagnetic interference) and/or RFI (radio-frequency interference) shielding. Examples of such EMI/RFI shielding are disclosed in U.S. Pat. Nos. 5,087,314 (Sandborn et al.) and 5,700,398 (Angelopoulos et al.), both incorporated herein by reference.

Electrodes

One or more hollow Plasma-tubes containing the ionizable gas are located within the display panel structure, each Plasma-tube being in contact with electrodes. In accordance with this invention, the contact is made by an electrically conductive bonding substance applied to each tube so as to form an electrically conductive pad for connection to the electrodes. A dielectric substance may also be used in lieu of or in addition to the conductive substance. Each electrode pad may partially cover the outside shell surface of the Plasma-tube. The electrodes and pads may be of any geometric shape or configuration. In one embodiment the electrodes are opposing arrays of electrodes, one array of electrodes being transverse or orthogonal to an opposing array of electrodes. The electrode arrays can be parallel, zigzag, serpentine, or like pattern as typically used in dot-matrix gas discharge (plasma) displays. The use of split or divided electrodes is contemplated as disclosed in U.S. Pat. Nos. 3,603,836 (Grier) and 3,701,184 (Grier), incorporated herein by reference. Apertured electrodes may be used as disclosed in U.S. Pat. Nos. 6,118,214 (Marcotte) and 5,411,035 (Marcotte), and U.S. Patent Application Publication 2004/0001034 (Marcotte), all incorporated herein by reference. The electrodes are of any suitable conductive metal or alloy including gold, silver, aluminum, or chrome-copper-chrome. If a transparent electrode is used on the viewing surface, this is typically indium tin oxide (ITO) or tin oxide with a conductive side or edge bus bar of silver. Other conductive bus bar materials may be used such as gold, aluminum, or chrome-copper-chrome. The electrodes may partially cover the external surface of the Plasma-tube. The electrode array may be divided into two portions and driven from both sides with dual scan architecture as disclosed in U.S. Pat. Nos. 4,233,623 (Pavliscak) and 4,320,418 (Pavliscak), both incorporated herein by reference. A flat Plasma-tube surface is particularly suitable for connecting electrodes to the Plasma-tube. If one or more electrodes connect to the bottom of Plasma-tube, a flat bottom surface is desirable. Likewise, if one or more electrodes connect to the top or sides of the Plasma-tube it is desirable for the connecting surface of such top or sides to be flat. The electrodes may be applied to the substrate or to the Plasma-tubes by thin film methods such as vapor phase deposition, E-beam evaporation, sputtering, conductive doping, etc. or by thick film methods such as screen printing, ink jet printing, etc. In a matrix display, the electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. Each hollow Plasma-tube containing ionizable gas is positioned in the gas discharge (plasma) display device at the intersection of opposing electrodes. When an appropriate voltage potential is applied to an opposing pair of electrodes, the ionizable gas inside of the Plasma-tube at the crossover is energized and a gas discharge occurs. Photons of light in the visible and/or invisible range are emitted by the gas discharge.

Shell Geometry

As illustrated in the drawings the Plasma-tubes may be of any suitable volumetric shape or geometric configuration to encapsulate the ionizable gas independently of the PDP or PDP substrate. The thickness of the wall of each hollow Plasma-tube must be sufficient to retain the gas inside, but thin enough to allow passage of photons emitted by the gas discharge. The wall thickness of the Plasma-tube should be kept as thin as practical to minimize photon absorption, but thick enough to retain sufficient strength so that the Plasma-tubes can be easily handled and pressurized. The gas discharge length is determined by the distance or spacing between the electrodes in contact with the Plasma-tube. The electrode spacing may be varied for different phosphors, gases, color intensities, and so forth. Also the dimensions of the Plasma-tube may be varied for different phosphors, gases, color intensities, and so forth. Thus the dimensions of each Plasma-tube may be varied for different phosphors to achieve color balance. For a gas discharge display having phosphors which emit red, green, and blue light in the visible range, the Plasma-tubes for the red phosphor may have a flat base length or width less than the flat base lengths or widths of the Plasma-tubes for the green or blue phosphor. Typically the flat base length or width of the red phosphor Plasma-tubes is about 80% to 95% of the flat base length or width of the green phosphor Plasma-tubes. The flat base length or width dimension of the blue phosphor Plasma-tubes may be greater than the flat base length or width dimensions of the red or green phosphor Plasma-tubes. Typically the Plasma-tube flat base length or width for the blue phosphor is about 105% to 125% of the Plasma-tube flat base length or width for the green phosphor and about 110% to 155% of the flat base length or width of the red phosphor. In another embodiment using a high brightness green phosphor, the red and green Plasma-tubes may be reversed such that the flat base length or width of the green phosphor Plasma-tube is about 80% to 95% of the flat base length or width of the red phosphor Plasma-tube. In this embodiment, the flat base length or width of the blue Plasma-tube is 105% to 125% of the flat base length or width for the red phosphor and about 110% to 155% of the flat base length or width of the green phosphor. Thus the dimensions of each Plasma-tube may be varied for different phosphors, gases, color intensities, and so forth. The red, green, and blue Plasma-tubes may also have different dimensions so as to enlarge voltage margin and improve luminance uniformity as disclosed in U.S. Patent Application Publication 2002/0041157 A1 (Heo), incorporated herein by reference. The widths of the corresponding electrodes for each RGB Plasma-tube may be of different dimensions such that an electrode is wider or narrower for a selected phosphor as disclosed in U.S. Pat. No. 6,034,657 (Tokunaga et al.), incorporated herein by reference. There also may be used combinations of different geometric shapes for different colors. Thus there may be used a square cross section Plasma-tube for one color, a circular cross-section for another color, and another geometric cross section for a third color.

Organic Luminescent Substance

Organic luminescent substances may be used alone or in combination with inorganic luminescent substances. Contemplated combinations include mixtures and/or selective layers of organic and inorganic substances. In accordance with one embodiment of this invention, an organic luminescent substance is located in close proximity to the enclosed gas discharge within a Plasma-tube, so as to be excited by photons from the enclosed gas discharge. In accordance with one preferred embodiment of this invention, an organic photoluminescent substance is positioned on at least a portion of the external surface of a Plasma-tube, so as to be excited by photons from the gas discharge within the Plasma-tube, such that the excited photoluminescent substance emits visible and/or invisible light. As used herein organic luminescent substance comprises one or more organic compounds, monomers, dimers, trimers, polymers, copolymers, or like organic materials, which emit visible and/or invisible light when excited by photons from the gas discharge inside of the Plasma-tube. Such organic luminescent substance may include one or more organic photoluminescent phosphors selected from organic photoluminescent compounds, organic photoluminescent monomers, dimers, trimers, polymers, copolymers, organic photoluminescent dyes, organic photoluminescent dopants and/or any other organic photoluminescent material. All are collectively referred to herein as organic photoluminescent phosphor. Organic photoluminescent phosphor substances contemplated herein include those organic light-emitting diodes or devices (OLED) and organic electroluminescent (EL) materials, which emit light when excited by photons from the gas discharge of a gas plasma discharge. OLED and organic EL substances include the small molecule organic EL and the large molecule or polymeric OLED. Small molecule organic EL substances are disclosed in U.S. Pat. Nos. 4,720,432 (VanSlyke et al.), 4,769,292 (Tang et al.), 5,151,629 (VanSlyke), 5,409,783 (Tang et al.), 5,645,948 (Shi et al.), 5,683,823 (Shi et al.), 5,755,999 (Shi et al.), 5,908,581 (Chen et al.), 5,935,720 (Chen et al.), 6,020,078 (Chen et al.), 6,069,442 (Hung et al.), 6,348,359 (VanSlyke et al.), and 6,720,090 (Young et al.), all incorporated herein by reference. The small molecule organic light-emitting devices may be called SMOLED. Large molecule or polymeric OLED substances are disclosed in U.S. Pat. Nos. 5,247,190 (Friend et al.), 5,399,502 (Friend et al.), 5,540,999 (Yamamoto et al.), 5,900,327 (Pei et al.), 5,804,836 (Heeger et al.), 5,807,627 (Friend et al.), 6,361,885 (Chou), and 6,670,645 (Grushin et al.), all incorporated herein by reference. The polymer light-emitting devices may be called PLED. Organic luminescent substances also include OLEDs doped with phosphorescent compounds as disclosed in U.S. Pat. No. 6,303,238 (Thompson et al.), incorporated herein by reference. Organic photoluminescent substances are also disclosed in U.S. Patent Application Publication Nos. 2002/0101151 (Choi et al.), 2002/0063526 (Choi et al.), 2003/0003225 (Choi et al.) and. 2003/0052596 (Yi et al.), U.S. Pat. Nos. 6,610,554 (Yi et al.) and 6,692,326 (Choi et al.); and International Publications WO 02/104077 and WO 03/046649, all incorporated herein by reference. In one embodiment of this invention, the organic luminescent phosphorous substance is a color-conversion-media (CCM) that converts light (photons) emitted by the gas discharge to visible or invisible light. Examples of CCM substances include the fluorescent organic dye compounds. In another embodiment, the organic luminescent substance is selected from a condensed or fused ring system such as a perylene compound, a perylene based compound, a perylene derivative, a perylene based monomer, dimer or trimer, a perylene based polymer, and/or a substance doped with a perylene. Photoluminescent perylene phosphor substances are widely known in the prior art. U.S. Pat. No. 4,968,571 (Gruenbaum et al.), incorporated herein by reference, discloses photoconductive perylene materials, which may be used as photoluminescent phosphorous substances. U.S. Pat. No. 5,693,808 (Langhals), incorporated herein by reference, discloses the preparation of luminescent perylene dyes. U.S. Patent Application Publication 2004/0009367 (Hatwar), incorporated herein by reference, discloses the preparation of luminescent materials doped with fluorescent perylene dyes. U.S. Pat. No. 6,528,188 (Suzuki et al.), incorporated herein by reference, discloses the preparation and use of luminescent perylene compounds. These condensed or fused ring compounds are conjugated with multiple double bonds and include monomers, dimers, trimers, polymers, and copolymers. In addition, conjugated aromatic and aliphatic organic compounds are contemplated including monomers, dimers, trimers, polymers, and copolymers. Conjugation as used herein also includes extended conjugation. A material with conjugation or extended conjugation absorbs light and then transmits the light to the various conjugated bonds. Typically the number of conjugate-double bonds ranges from about 4 to about 15. Further examples of conjugate-bonded or condensed/fused benzene rings are disclosed in U.S. Pat. Nos. 6,614,175 (Aziz et al.) and 6,479,172 (Hu et al.), both incorporated herein by reference. U.S. Patent Application Publication 2004/0023010 (Bulovic et al.) discloses luminescent nanocrystals with organic polymers including conjugated organic polymers. Cumulene is conjugated only with carbon and hydrogen atoms. Cumulene becomes more deeply colored as the conjugation is extended. Other condensed or fused ring luminescent compounds may also be used including naphthalimides, substituted naphthalimides, naphthalimide monomers, dimers, trimers, polymers, copolymers and derivatives thereof including naphthalimide diester dyes such as disclosed in U.S. Pat. No. 6,348,890 (Likavec et al.), incorporated herein by reference. The organic luminescent substance may be an organic lumophore, for example as disclosed in U.S. Pat. Nos. 5,354,825 (Klainer et al.), 5,480,723 (Klainer et al.), 5,700,897 (Klainer et al.), and 6,538,263 (Park et al.), all incorporated by reference. Also lumophores are disclosed in S. E. Shaheen et al., *Journal of Applied Physics*, Vol. 84, Number 4, pages 2324 to 2327, Aug. 15, 1998; J. D. Anderson et al., *Journal American Chemical Society* 1998, Vol. 120, pages 9646 to 9655; and Gyu Hyun Lee et al., *Bulletin of Korean Chemical Society*, 2002, Vol. 23, NO. 3, pages 528 to 530, all incorporated herein by reference. The organic luminescent substance may be applied by any suitable method to the external surface of the Plasma-tube, to the substrate or to any location in close proximity to the gas discharge contained within the Plasma-tube. Such methods include thin film deposition methods such as vapor phase deposition, sputtering and E-beam evaporation. Also thick film or application methods may be used such as screen-printing, ink jet printing, and/or slurry techniques. Small size molecule OLED materials are typically deposited upon the external surface of the Plasma-tube by thin film deposition methods such as vapor phase deposition or sputtering. Large size molecule or polymeric OLED materials are deposited by so called thick film or application methods such as screen-printing, ink jet, and/or slurry techniques. If the organic luminescent substance such as a photoluminescent phosphor is applied to the external surface of the Plasma-tube, it may be applied as a continuous or discontinuous layer or coating such that the Plasma-tube is completely or partially covered with the luminescent substance.

Selected Specific Organic Phosphor Embodiments and Applications

The following are some specific embodiments using an organic luminescent substance such as a luminescent phosphor.

Color Plasma Displays Using UV 300 nm to 380 nm Excitation with Organic Phosphors The organic luminescent substance such as an organic phosphor may be excited by UV ranging from about 300 nm to about 380 nm to produce red, blue, or green emission in the visible range. The encapsulated gas is chosen to excite in this range. To improve life, the organic phosphor should be separated from the plasma discharge. This may be done by applying the organic phosphor to the exterior of the Plasma-tube shell. In this case, it is important that the shell material be selected such that it is transmissive to UV in the range of about 300 nm to about 380 nm. Suitable materials include aluminum oxides, silicon oxides, and other such materials. In the case where helium is used in the gas mixture, aluminum oxide is a desirable shell material, as it does not allow the helium to permeate.

Color Plasma Displays Using UV Excitation Below 300 nm with Organic Phosphors

Organic phosphors may be excited by UV below 300 nm. In this case, a xenon neon mixture of gases may produce excitation at 147 nm and 172 nm. The Plasma-tube material must be transmissive below 300 nm. Shell materials that are transmissive to frequencies below 300 nm include silicon oxide. The thickness of the shell material must be minimized in order to maximize transmissivity.

Color Plasma Displays Using Visible Blue Above 380 nm with Organic Phosphors

Organic phosphors may be excited by excitation above 380 nm. The Plasma-tube material is composed completely or partially of an inorganic blue phosphor such as BAM. The shell material fluoresces blue and may be up-converted to red or green with organic phosphors on the outside of the shell.

Infrared Plasma Displays

In some applications it may be desirable to have PDP displays with Plasma-tubes that produce emission in the infrared range for use in night vision applications. This may be done with up-conversion phosphors as described herein.

Application of Organic Phosphors

Organic phosphors may be added to a UV curable medium and applied to the Plasma-tube with a variety of methods including jetting, spraying, brushing, sheet transfer methods, spin coating, dip coating, or screen-printing. Thin film deposition processes are contemplated including vapor phase deposition and thin film sputtering at temperatures that do not degrade the organic material. This may be done before or after the Plasma-tube is added to a substrate or back plate.

Application of Phosphor Before Plasma-Tubes are Added to Substrate

If organic phosphors are applied to the Plasma-tubes before such are applied to the substrate, additional steps may be necessary to place each Plasma-tube in the correct position on the back substrate.

Application of Phosphor after Plasma-Tubes are Added to Substrate

If the organic phosphor is applied to the Plasma-tubes after such are placed on a substrate, care must be taken to align the appropriate phosphor color with the appropriate Plasma-tube.

Application of Phosphor after Plasma-Tubes are Added to Substrate Self-Aligning

In one embodiment, the Plasma-tubes may be used to cure the phosphor. A single color organic phosphor is completely applied to the entire substrate containing the Plasma-tubes. Next the Plasma-tubes are selectively activated to produce UV to cure the organic phosphor. The phosphor will cure on the Plasma-tubes that are activated and may be rinsed away from the Plasma-tubes that were not activated. Additional applications of phosphor of different colors may be applied using this method to coat the remaining shells. In this way the process is completely self-aligning.

Inorganic Luminescent Substances

Inorganic luminescent substances may be used alone or in combination with organic luminescent substances. Contemplated combinations include mixtures and/or selective layers of organic and/or inorganic substances. The tube shell may be made of inorganic luminescent substance. In one embodiment the inorganic luminescent substance is incorporated into the particles forming the shell structure. Typical inorganic luminescent substances are listed below.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, CdS:$Al_2$, $Cd_2O_2S$:Tb, and $Y_2O_2S$:Tb. In one mode and embodiment of this invention using a green light-emitting phosphor, there is used a green light-emitting phosphor selected from the zinc orthosilicate phosphors such as $ZnSiO_4$:$Mn^{2+}$. Green light-emitting zinc orthosilicates including the method of preparation are disclosed in U.S. Pat. No. 5,985,176 (Rao), which is incorporated herein by reference. These phosphors have a broad emission in the green region when excited by 147 nm and 173 nm (nanometer) radiation from the discharge of a xenon gas mixture. In another mode and embodiment of this invention there is used a green light-emitting phosphor which is a terbium activated yttrium gadolinium borate phosphor such as $(Gd, Y) BO_3$:$Tb^{3+}$. Green light-emitting borate phosphors including the method of preparation are disclosed in U.S. Pat. No. 6,004,481 (Rao), which is incorporated herein by reference. In another mode and embodiment there is used a manganese activated alkaline earth aluminate green phosphor as disclosed in U.S. Pat. No. 6,423,248 (Rao), peaking at 516 nm when excited by 147 and 173 nm radiation from xenon. The particle size ranges from 0.05 to 5 microns. Rao ('248) is incorporated herein by reference. Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated. Green light-emitting terbium-activated lanthanum cerium orthophosphate phosphors are disclosed in U.S. Pat. No. 4,423,349 (Nakajima et al.), which is incorporated herein by reference. Green light-emitting lanthanum cerium terbium phosphate phosphors are disclosed in U.S. Pat. No. 5,651,920 (Chau et al.), which is incorporated herein by reference. Green light-emitting phosphors may also be selected from the trivalent rare earth ion-containing aluminate phosphors as disclosed in U.S. Pat. No. 6,290,875 (Oshio et al.).

Blue Phosphor

A blue light-emitting phosphor may be used alone or in combination with other light-emitting phosphors such as green or red. Phosphor materials which emit blue light include ZnS:Ag, ZnS:Cl, and CsI:Na. In a preferred mode and embodiment of this invention, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}$:$Eu^{2+}$. BAM is widely used as a blue phosphor in the PDP industry. BAM and other aluminate phosphors, which emit blue visible light, are disclosed in U.S. Pat. Nos. 5,611,959 (Kijima et al.) and 5,998,047 (Bechtel et al.), both incorporated herein by reference. The aluminate phosphors may also be selectively coated as disclosed by Bechtel et al. ('047). Blue light-emitting phosphors may be selected from a number of divalent europium-activated aluminates such as disclosed in U.S. Pat. No. 6,096,243 (Oshio et al.), incorporated herein by reference. The preparation of BAM phosphors for a PDP is also disclosed in U.S. Pat. No. 6,045,721 (Zachau et al.), incorporated herein by reference. In another mode and embodiment of this invention, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), which is incorporated herein by reference. In a best mode and embodiment of this invention using a blue-emitting phosphor, a mixture or blend of blue light-emitting phosphors is used such as a blend or complex of about 85% to 70% by weight of a lanthanum phosphate phosphor activated by trivalent thulium ($Tm^{3+}$), $Li^+$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference. A blue BAM phosphor with partially substituted $Eu^{2+}$ is disclosed in U.S. Pat. No. 6,833,672 (Aoki et al.) and is also incorporated herein by reference. Blue light-emitting phosphors also include $ZnO.Ga_2O_3$ doped with Na or Bi. The preparation of these phosphors is disclosed in U.S. Pat. Nos. 6,217,795 (Yu et al.) and 6,322,725 (Yu et al.), both incorporated herein by reference. Other blue light-emitting phosphors include europium-activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S$:Eu and $Y_2O_3S$:Eu. In a best mode and embodiment of this invention using a red-emitting phosphor, there is used a red light-emitting phosphor which is an europium activated yttrium gadolinium borate phosphors such as $(Y,Gd)BO_3$:$Eu^{3+}$. The composition and preparation of these red light-emitting borate phosphors is disclosed in U.S. Pat. Nos. 6,042,747 (Rao) and 6,284,155 (Rao), both incorporated herein by reference. These europium activated yttrium, gadolinium borate phosphors emit an orange line at 593 nm and red emission lines at 611 nm and 627 nm when excited by 147 nm and 173 nm UV radiation from the discharge of a xenon gas mixture. For television (TV) applications, it is preferred to have only the red emission lines (611 nm and 627 nm). The orange line (593 nm) may be minimized or eliminated with an external optical filter. A wide range of red light-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter. Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$. White light-emitting phosphors are disclosed in U.S. Pat. No. 6,200,496 (Park et al.) incorporated herein by reference. Pink light-emitting phosphors are disclosed in U.S. Pat. No. 6,200,497 (Park et al.) incorporated herein by reference. Phosphor material, which emits yellow light, include ZnS:Au.

Organic and Inorganic Luminescent Materials

Inorganic and organic luminescent materials may be used in selected combinations. In one embodiment, multiple layers of luminescent materials are applied to the Plasma-tube with at least one layer being organic and at least one layer being inorganic. An inorganic layer may serve as a protective overcoat for an organic layer. In another embodiment, the shell of the Plasma-tube comprises or contains inorganic luminescent material. In another embodiment, organic and inorganic luminescent materials are mixed together and applied as a layer inside or outside the shell. The shell may also be made of or contain a mixture of organic and inorganic luminescent materials. In one preferred embodiment, a mixture of organic and inorganic material is applied outside the shell.

Photon Exciting of Luminescent Substance

In one embodiment contemplated in the practice of this invention, a layer, coating, or particles of inorganic and/or organic luminescent substances such as phosphor is located on part or all of the exterior wall surfaces of the Plasma-tube. The photons of light pass through the shell or wall(s) of the Plasma-tube and excite the organic or inorganic photoluminescent phosphor located outside of the Plasma-tube. Typically this is red, blue, or green light. However, phosphors may be used which emit other light such as white, pink, or yellow light. In some embodiments of this invention, the emitted light may not be visible to the human eye. Up-conversion or down-conversion phosphors may be used. The phosphor may be located on the side wall(s) of a channel, trench, barrier, groove, cavity, well, hollow or like structure of the discharge space. The gas discharge within the channel, trench, barrier, groove, cavity, well or hollow produces photons that excite the inorganic and/or organic phosphor such that the phosphor emits light in a range visible to the human eye. In prior art AC plasma display structures as disclosed in U.S. Pat. Nos. 5,793,158 (Wedding) and 5,661,500 (Shinoda), inorganic and/or organic phosphor is located on the wall(s) or side(s) of the barriers that form the channel, trench, groove, cavity, well, or hollow. Phosphor may also be located on the bottom of the channel, trench or groove as disclosed by Shinoda et al. ('500) or the bottom cavity, well, or hollow as disclosed by U.S. Pat. No. 4,827,186 (Knauer et al.). The Plasma-tubes are positioned within or along the walls of a channel, barrier, trench, groove, cavity, well or hollow so as to be in close proximity to the phosphor such that photons from the gas discharge within the Plasma-tube cause the phosphor along the wall(s), side(s) or at the bottom of the channel, barrier, trenches groove, cavity, well, or hollow, to emit light. In one embodiment of this invention, phosphor is located on the outside surface of each Plasma-tube. In this embodiment, the outside surface is at least partially covered with phosphor that emits light in the visible or invisible range when excited by photons from the gas discharge within the Plasma-tube. The phosphor may emit light in the visible, UV, and/or IR range. In one embodiment, phosphor is dispersed and/or suspended within the ionizable gas inside each Plasma-tube. In such embodiment, the phosphor particles are sufficiently small such that most of the phosphor particles remain suspended within the gas and do not precipitate or otherwise substantially collect on the inside wall of the Plasma-tube. The average diameter of the dispersed and/or suspended phosphor particles is less than about 1 micron, typically less than 0.1 microns. Larger particles can be used depending on the size of the Plasma-tube. The phosphor particles may be introduced by means of a fluidized bed. The luminescent substance such as an inorganic and/or organic luminescent phosphor may be located on all or part of the external surface of the Plasma-tubes on all or part of the internal surface of the Plasma-tubes. The phosphor may comprise particles dispersed or floating within the gas. In another embodiment, the luminescent material is incorporated into the shell of the Plasma-tube. The inorganic and/or organic luminescent substance is located on the external surface and is excited by photons from the gas discharge inside the Plasma-tube. The phosphor emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors. The phosphor thickness is sufficient to absorb the UV, but thin enough to emit light with minimum attenuation. Typically the phosphor thickness is about 2 to 40 microns, preferably about 5 to 15 microns. In one embodiment, dispersed or floating particles within the gas are typically spherical or needle shaped having an average size of about 0.01 to 5 microns. A UV photoluminescent phosphor is excited by UV in the range of 50 to 400 nanometers. The phosphor may have a protective layer or coating which is transmissive to the excitation UV and the emitted visible light. Such include organic films such as perylene or inorganic films such as aluminum oxide or silica. Protective overcoats are disclosed and discussed below. Because the ionizable gas is contained within a multiplicity of Plasma-tubes, it is possible to provide a custom gas mixture or composition at a custom pressure in each Plasma-tube for each phosphor. In the prior art, it is necessary to select an ionizable gas mixture and a gas pressure that is optimum for all phosphors used in the device such as red, blue, and green phosphors. However, this requires trade-offs because a particular gas mixture may be optimum for a particular green phosphor, but less desirable for red or blue phosphors. In addition, trade-offs are required for the gas pressure. In the practice of this invention, an optimum gas mixture and an optimum gas pressure may be provided for each of the selected phosphors. Thus the gas mixture and gas pressure inside the Plasma-tubes may be optimized with a custom gas mixture and a custom gas pressure, each or both optimized for each phosphor emitting red, blue, green, white, pink, or yellow light in the visible range or light in the invisible range. The diameter and the wall thickness of the Plasma-tube can also be adjusted and optimized for each phosphor. Depending upon the Paschen Curve (pd v. voltage) for the particular ionizable gas mixture, the operating voltage may be decreased by optimized changes in the gas mixture, gas pressure, and the dimensions of the Plasma-tube including the distance between electrodes.

Up-Conversion

In another embodiment of this invention it is contemplated using an inorganic and/or organic luminescent substance such as a Stokes phosphor for up-conversion, for example to convert infrared radiation to visible light. Up-conversion or Stokes materials include phosphors as disclosed in U.S. Pat. Nos. 3,623,907 (Watts), 3,634,614 (Geusic), 5,541,012 (Ohwaki et al.), 6,265,825 (Asano), and 6,624,414 (Glesener), all incorporated herein by reference. Up-conversion may also be obtained with shell compositions such as thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR. Glasses for up-conversion are also disclosed in Japanese Patent Nos. 9054562 and 9086958 (Akira et al.), both incorporated herein by reference. U.S. Pat. No. 5,166,948 (Gavrilovic) discloses an up-conversion crystalline structure. U.S. Pat. No. 6,726,992 (Yadav et al.) discloses nano-engineered luminescent materials including both Stokes and Anti-Stokes down-conversion phosphors. It is contemplated that the Plasma-tube shell may be constructed wholly or in part from an up-conversion material, down-conversion material or a combination of both.

Down-Conversion

The luminescent material may also include down-conversion (Anti-Stokes) materials such as phosphors as disclosed in U.S. Pat. No. 3,838,307 (Masi), incorporated herein by reference. Down-conversion luminescent materials are also disclosed in U.S. Pat. Nos. 6,013,538 (Burrows et al.), 6,091,195 (Forrest et al.), 6,208,791 (Bischel et al.), 6,566,156 (Sturm et al.) and 6,650,045 (Forrest et al.). Down-conversion luminescent materials are also disclosed in U.S. Patent Application Publication Nos. 2004/0159903 (Burgener, II et al.) and 2004/0196538 (Burgener, II et al.), 2005/0093001 (Liu et al.) and 2005/0094109 (Sun et al.). Anti-Stokes phosphors are also disclosed in European Patent 0143034 (Maestro et al.), which is also incorporated herein by reference. As noted above, the Plasma-tube shell may be constructed wholly or in part from a down-conversion material, up-conversion material or a combination of both.

Quantum Dots

In one embodiment of this invention, the luminescent substance is a quantum dot material. Examples of luminescent quantum dots are disclosed in International Publication Numbers WO 03/038011, WO 00/029617, WO 03/038011, WO 03/100833, and WO 03/037788, all incorporated herein by reference. Luminescent quantum dots are also disclosed in U.S. Pat. Nos. 6,468,808 (Nie et al.), 6,501,091 (Bawendi et al.), 6,698,313 (Park et al.), and U.S. Patent Application Publication 2003/0042850 (Bertram et al.), all incorporated herein by reference. The quantum dots may be added or incorporated into the shell during shell formation or after the shell is formed.

Protective Overcoat

In a preferred embodiment, the luminescent substance is located on an external surface of the Plasma-tube. Organic luminescent phosphors are particularly suitable for placing on the exterior shell surface, but may require a protective overcoat. The protective overcoat may be inorganic, organic, or a combination of inorganic and organic. This protective overcoat may be an inorganic and/or organic luminescent material. The luminescent substance may have a protective overcoat such as a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance. Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment. In one embodiment hereof the luminescent substance is coated with a film or layer of a perylene compound including monomers, dimers, trimers, polymers, copolymers, and derivatives thereof. The perylene compounds are widely used as protective films. Specific compounds include poly-monochloro-para-xylylene (Parylene C) and poly-para-xylylene (Parylene N). Parylene polymer films are also disclosed in U.S. Pat. Nos. 5,879,808 (Wary et al.) and 6,586,048 (Welch et al.), both incorporated herein by reference. The perylene compounds may be applied by ink jet printing, screen printing, spraying, and so forth as disclosed in U.S. Patent Application Publication 2004/0032466 (Deguchi et al.), incorporated herein by reference. Parylene conformal coatings are covered by Mil-I-46058C and ISO 9002. Parylene films may also be induced into fluorescence by an active plasma as disclosed in U.S. Pat. No. 5,139,813 (Yira et al.), incorporated herein by reference. Phosphor overcoats are also disclosed in U.S. Pat. Nos. 4,048,533 (Hinson et al.), 4,315,192 (Skwirut et al.), 5,592,052 (Maya et al.), 5,604,396 (Watanabe et al.), 5,793,158 (Wedding), and 6,099,753 (Yoshimura et al.), all incorporated herein by reference. In some embodiments, the luminescent substance is selected from materials that do not degrade when exposed to oxygen, moisture, sunlight, etc. and that may not require a protective overcoat. Such include various organic luminescent substances such as the perylene compounds disclosed above. For example, perylene compounds may be used as protective overcoats and thus do not require a protective overcoat.

Tinted Plasma-Tubes

In the practice of this invention, the Plasma-tube may be color tinted or constructed of materials that are color tinted with red, blue, green, yellow, or like pigments. This is disclosed in U.S. Pat. No. 4,035,690 (Roeber) cited above and incorporated herein by reference. The gas discharge may also emit color light of different wavelengths as disclosed in Roeber ('690). The use of tinted materials and/or gas discharges emitting light of different wavelengths may be used in combination with the above described phosphors and the light emitted from such phosphors. Optical filters may also be used.

Filters

This invention may be practiced in combination with an optical and/or electromagnetic (EMI) filter, screen and/or shield. It is contemplated that the filter, screen, and/or shield may be positioned on a PDP constructed of Plasma-tubes, for example on the front or top-viewing surface. The Plasma-tubes may also be tinted. Examples of optical filters, screens, and/or shields are disclosed in U.S. Pat. Nos. 3,960,754 (Woodcock), 4,106,857 (Snitzer), 4,303,298, (Yamashita), 5,036,025 (Lin), 5,804,102 (Oi), and 6,333,592 (Sasa et al.), all incorporated herein by reference. Examples of EMI filters, screens, and/or shields are disclosed in U.S. Pat. Nos. 6,188,174 (Marutsuka) and 6,316,110 (Anzaki et al.), incorporated herein by reference. Color filters may also be used. Examples are disclosed in U.S. Pat. Nos. 3,923,527 (Matsuura et al.), 4,105,577 (Yamashita), 4,110,245 (Yamashita), and 4,615,989 (Ritze), all incorporated by reference.

Mixtures of Luminescent Materials

It is contemplated that mixtures of luminescent materials may be used including inorganic and inorganic, organic and organic, and inorganic and organic. Dispersing inorganic materials into organic luminescent materials or vice versa may increase the brightness of the luminescent material. Stokes or Anti-Stokes materials may be used.

Layers of Luminescent Materials

Two or more layers of the same or different luminescent materials may be selectively applied to the Plasma-tubes. Such layers may comprise combinations of organic and organic, inorganic and inorganic, and/or inorganic and organic.

Stacking of Plasma-Tubes

In a multicolor display such as RGB PDP, Plasma-tubes with flat sides may be stacked on top of each other or arranged in parallel side-by-side positions on the substrate. This configuration requires less area of the display surface compared to conventional RGB displays that require red, green and blue pixels adjacent to each other on the substrate. This stacking embodiment may be practiced with Plasma-tubes that use various color emitting gases such as the excimer gases. Phosphor coated Plasma-tubes in combination with excimers may also be used. Each Plasma-tube may also be of a different color material such as tinted glass.

Plasma-Tubes Combined with Plasma-Shells

The PDP structure may comprise a combination of Plasma-tubes and Plasma-shells. Plasma-tubes comprise elongated tubes as disclosed herein and also as disclosed in U.S. Pat. Nos. 3,602,754 (Pfaender et al.), 3,654,680 (Bode et al.), 3,927,342 (Bode et al.), 4,038,577 (Bode et al.), 3,969,718 (Strom), 3,990,068 (Mayer et al.), 4,027,188 (Bergman), 5,984,747 (Bhagavatula et al.), 6,255,777 (Kim et al.), 6,633,117 (Shinoda et al.), 6,650,055 (Ishimoto et al.), and 6,677,704 (Ishimoto et al.), all incorporated herein by reference. As used herein, the elongated Plasma-tube is intended to include capillary, filament, filamentary, illuminator, hollow rod, or other such terms. It includes an elongated enclosed gas-filled structure having a length dimension that is greater than its cross-sectional width dimension. A variety of geometric cross-sections are contemplated. The width of the Plasma-tube is typically the viewing width from the top or bottom (front or rear) of the display. A Plasma-tube has multiple gas discharge pixels of 100 or more, typically 500 to 1000 or more, whereas a Plasma-shell typically has only one gas discharge pixel. In some embodiments, the Plasma-shell may have more than one pixel, i.e. up to 10 pixels, depending upon the PDP structure. In one embodiment hereof, an elongated tube is selectively divided into a multiplicity of sections. In another embodiment, there is used a continuous tube that winds or weaves back and forth from one end to the other end of the PDP. The Plasma-tubes may be arranged in any configuration. In one embodiment, there are alternative rows of Plasma-tubes and Plasma-shells. The Plasma-shells may be used for any desired function or purpose including the priming or conditioning of the Plasma-tubes. In one embodiment, both Plasma-tubes and Plasma-shells are arranged around the perimeter of the display to provide priming or conditioning of the Plasma-tubes. The Plasma-tubes may be of any geometric cross-section including circular, elliptical, oval, square, rectangular, triangular, trapezoidal, pentagonal, hexagonal, or any other polygonal shape. The Plasma-tube may contain secondary electron emission materials, luminescent materials, and reflective materials as discussed herein. The Plasma-tubes may also utilize positive column discharge as discussed herein. If Plasma-shells are used in combination with Plasma-tubes, the selection and use of shell materials, luminescent substances, gases, and so forth as discussed herein for Plasma-tubes is also applicable to Plasma-shells.

SUMMARY

Aspects of this invention may be practiced with a coplanar or opposing substrate PDP as disclosed in the U.S. Pat. Nos. 5,793,158 (Wedding) and 5,661,500 (Shinoda et al.). There also may be used a single-substrate or monolithic PDP as disclosed in the U.S. Pat. Nos. 3,646,384 (Lay), 3,860,846 (Mayer), 3,935,484 (Dick et al.) and other single substrate patents, discussed above and incorporated herein by reference. Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge. The Plasma-tubes may contain other substances for radiation detection. Such substances may include other display materials such as electroluminescent, liquid crystal, field emission, and electrophoretic materials. The use of Plasma-tubes on a single flexible or bendable substrate allows the encapsulated pixel display device to be utilized in a number of radiation detection Application Publications. In this embodiment, a flexible sheet of Plasma-tubes may be provided as a blanket or cover over an object for radiation detection. Likewise, the object may be passed through a ring or cylinder of Plasma-tubes. In lieu of a circular ring or cylinder, other geometric shapes may be used such as a triangle, square, rectangle, pentagon, hexagon, etc. In this invention, the radiation detector device may be used to detect radiation from a nuclear device, mechanism, or apparatus hidden in a container. It is particularly suitable for detecting hidden nuclear devices at airports, loading docks, bridges, ship holds, and other such locations. The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In a radiation detector apparatus, the improvement wherein the detector comprises a single substrate gas discharge plasma device containing a multiplicity of gas discharge radiation detection pixels, each pixel being in electrical contact with two or more addressing electrodes, said multiplicity of gas discharge pixels being contained within one or more hollow Plasma-tubes filled with an ionizable gas, each said Plasma-tube being located on a surface of the single substrate, an external surface of each Plasma-tube containing a luminescent material that emits light when excited by photons from a gas discharge within a Plasma-tube, said single substrate comprising an elongated probing rod.

2. The invention of claim 1 wherein the device also contains one or more Plasma-shells selected from Plasma-disc, Plasma-dome, or Plasma-sphere.

3. The invention of claim 1 wherein one or more Plasma-tubes contains a gas that produces photons in the visible and/or invisible spectrum during gas discharge.

4. The invention of claim 1 wherein the luminescent material is an organic, an inorganic, or a combination of organic and inorganic substances.

5. The invention of claim 4 wherein the luminescent material covers part or all of the external surface of each Plasma-tube.

6. The invention of claim 1 wherein the apparatus contains Plasma-tubes of different geometric shape.

7. In a process for fabricating a radiation detector device comprising a single substrate gas discharge plasma device comprised of a multiplicity of gas discharge pixels, each pixel being in electrical contact with two or more addressing electrodes, the improvement which comprises positioning a multiplicity of ionizable gas filled radiation detection Plasma-tubes on a surface of a single substrate in electrical contact with the electrodes to form pixels within each Plasma-tube for detection of radiation, an external surface of each Plasma-tube containing a luminescent material, said single substrate comprising an elongated probing rod.

8. The invention of claim 7 wherein the device contains one or more Plasma-shells selected from Plasma-disc, Plasma-dome, or Plasma-sphere.

9. The invention of claim 7 wherein the luminescent material is an organic, an inorganic, or a combination of organic and inorganic substances.

10. The invention of claim 9 wherein the luminescent material covers part or all of the external surface of each Plasma-tube.

11. The invention of claim 7 wherein the device contains Plasma-tubes of different geometric shape.

12. A single substrate radiation detection device comprising a plasma display panel having a multiplicity of radiation detection pixel elements, said multiplicity of pixels being contained within one or more single hollow gas filled isolated Plasma-tubes positioned on the surface of a single substrate and connected to electrodes to form pixels for detection of radiation, an external surface of each Plasma-tube containing a luminescent material, said single substrate comprising an elongated probing rod.

13. The invention of claim 12 wherein the device contains one or more Plasma-shells selected from Plasma-disc, Plasma-dome, or Plasma-sphere.

14. The invention of claim 12 wherein the luminescent material is an organic, an inorganic, or a combination of organic and inorganic substances.

15. The invention of claim 14 wherein the luminescent material covers part or all of the external surface of each Plasma-tube.

16. The invention of claim 12 wherein the device contains Plasma-tubes of different geometric shape.

17. A radiation detection device comprising a multiplicity of radiation detecting Plasma-tubes filled with ionizable gas, the Plasma-tubes being positioned on the flat surface of a flexible single substrate and connected to electrodes to form pixels for detection of radiation, an external surface of each Plasma-tube containing a luminescent material, said single substrate comprising an elongated probing rod.

18. The invention of claim 17 wherein the luminescent material is an organic, an inorganic, or a combination of organic and inorganic substances.

19. The invention of claim 18 wherein the luminescent material covers part or all of the external surface of each Plasma-tube.

20. The invention of claim 17 wherein the device contains Plasma-tubes of different geometric shape.

21. The invention of claim 17 wherein the device contains one or more Plasma-shells selected from Plasma-disc, Plasma-dome, or Plasma-sphere.

* * * * *